(12) United States Patent
Norton

(10) Patent No.: US 6,364,352 B1
(45) Date of Patent: Apr. 2, 2002

(54) SEAT OCCUPANT WEIGHT SENSING SYSTEM

(76) Inventor: Peter Norton, P.O. Box 62, Northville, MI (US) 48167

( * ) Notice: Subject to any disclaimer, the term of this patent is extended or adjusted under 35 U.S.C. 154(b) by 0 days.

(21) Appl. No.: 09/289,048

(22) Filed: Apr. 9, 1999

Related U.S. Application Data

(63) Continuation-in-part of application No. 09/081,194, filed on May 19, 1998, now Pat. No. 6,224,094, and a continuation-in-part of application No. 09/112,727, filed on Jul. 9, 1997, now Pat. No. 6,259,167.

(51) Int. Cl.$^7$ ............................................. B60R 21/32
(52) U.S. Cl. ............... 280/735; 73/862.08; 73/862.322; 73/862.37; 73/862.581; 73/862.584
(58) Field of Search ................................ 280/734, 735; 73/862.08, 862.322, 862.37, 862.581, 862.584

(56) References Cited

U.S. PATENT DOCUMENTS

| | | | |
|---|---|---|---|
| 5,074,583 A | | 12/1991 | Fujita et al. |
| 5,413,378 A | * | 5/1995 | Steffens, Jr. et al. ........ 280/735 |
| 5,502,284 A | | 3/1996 | Meiller et al. |
| 5,877,677 A | | 3/1999 | Fleming et al. |
| 5,971,432 A | * | 10/1999 | Gagnon et al. ............. 280/735 |
| 6,039,344 A | * | 3/2000 | Mehney et al. ............. 280/735 |
| 6,089,106 A | * | 7/2000 | Patel et al. ................. 280/735 |
| 6,158,768 A | * | 12/2000 | Steffens, Jr. et al. ........ 280/735 |

FOREIGN PATENT DOCUMENTS

EP 529678 * 3/1993

* cited by examiner

Primary Examiner—Eric Culbreth

(57) ABSTRACT

A system for determining the weight of the occupant of a vehicle seat includes a hinge near the forward edge of the seat and a force sensor responsive to downward force at a point well to the rear of the hinge thereby indicating torque about the hinge. The system includes a microprocessor connected for receiving the output of the force sensor. The microprocessor may also receive outputs from an accelerometer responsive to vertical accelerations, a seat back recline angle sensor, a seat track position sensor, a seat belt tension sensor and an atmospheric pressure sensor. In a first embodiment the microprocessor determines the weight of the seat occupant from the outputs of the force sensor and the seat back recline sensor. In a second embodiment the microprocessor determines the weight of the seat occupant from the outputs of the force sensor, the seat back recline sensor and the seat track position sensor. A force sensor comprises a compressible bottle with a Belleville spring thereby being responsive to both compression and tension while resisting lateral forces and being insensitive to angular misalignment and temperature fluctuations. The microprocessor may use the accelerometer or the seat belt tension indicator or the two in combination to establish whether the force being sensed derives from seat belt tension applied to a child seat or from the weight of a person.

38 Claims, 6 Drawing Sheets

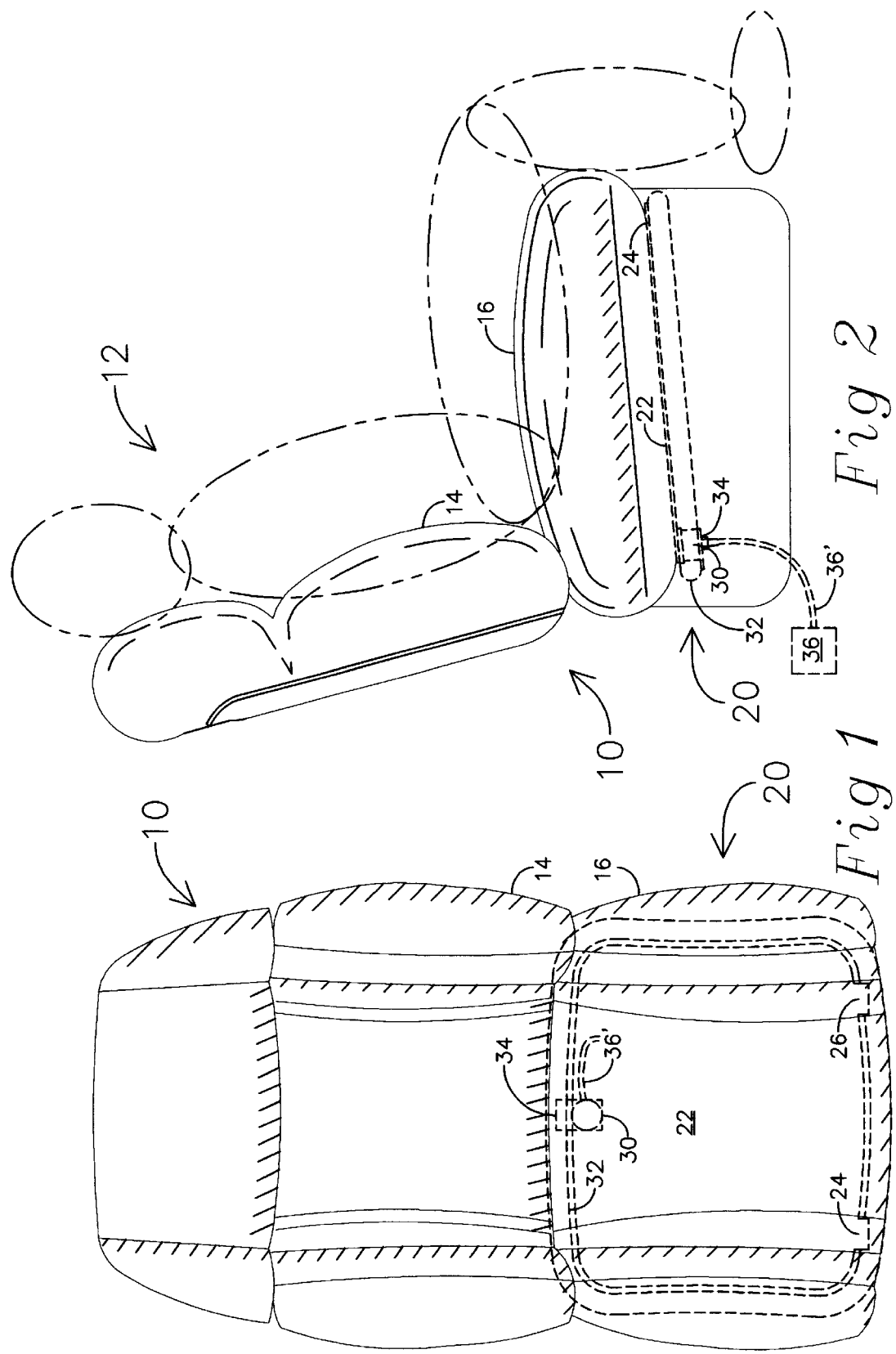

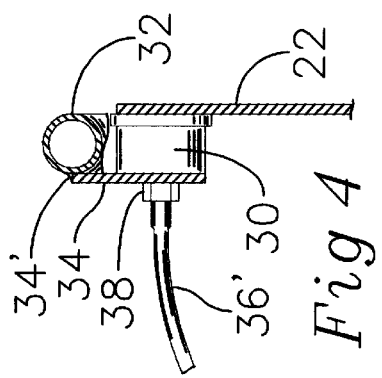
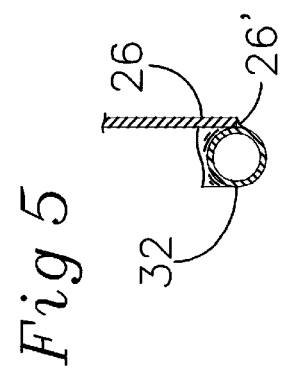
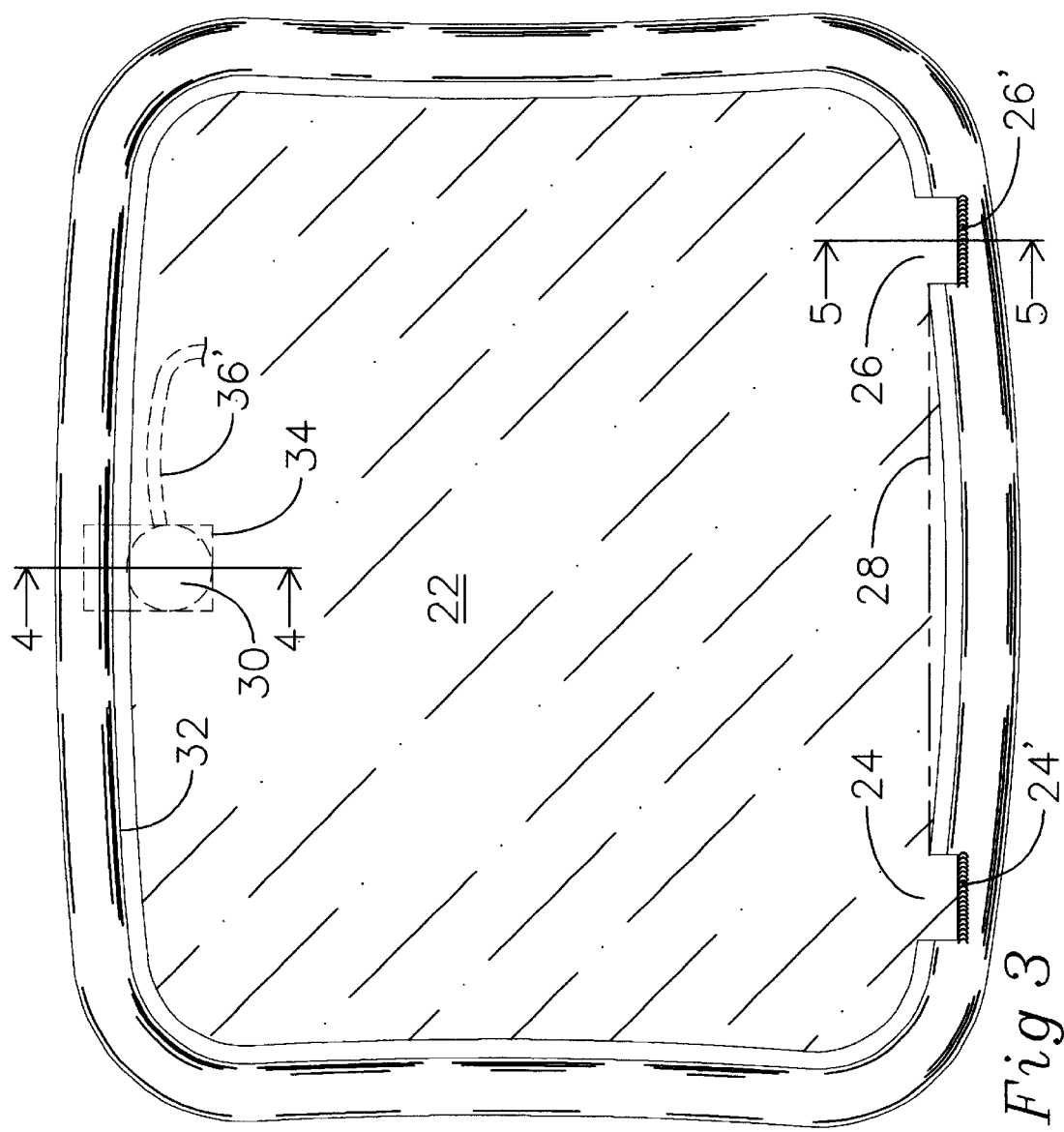

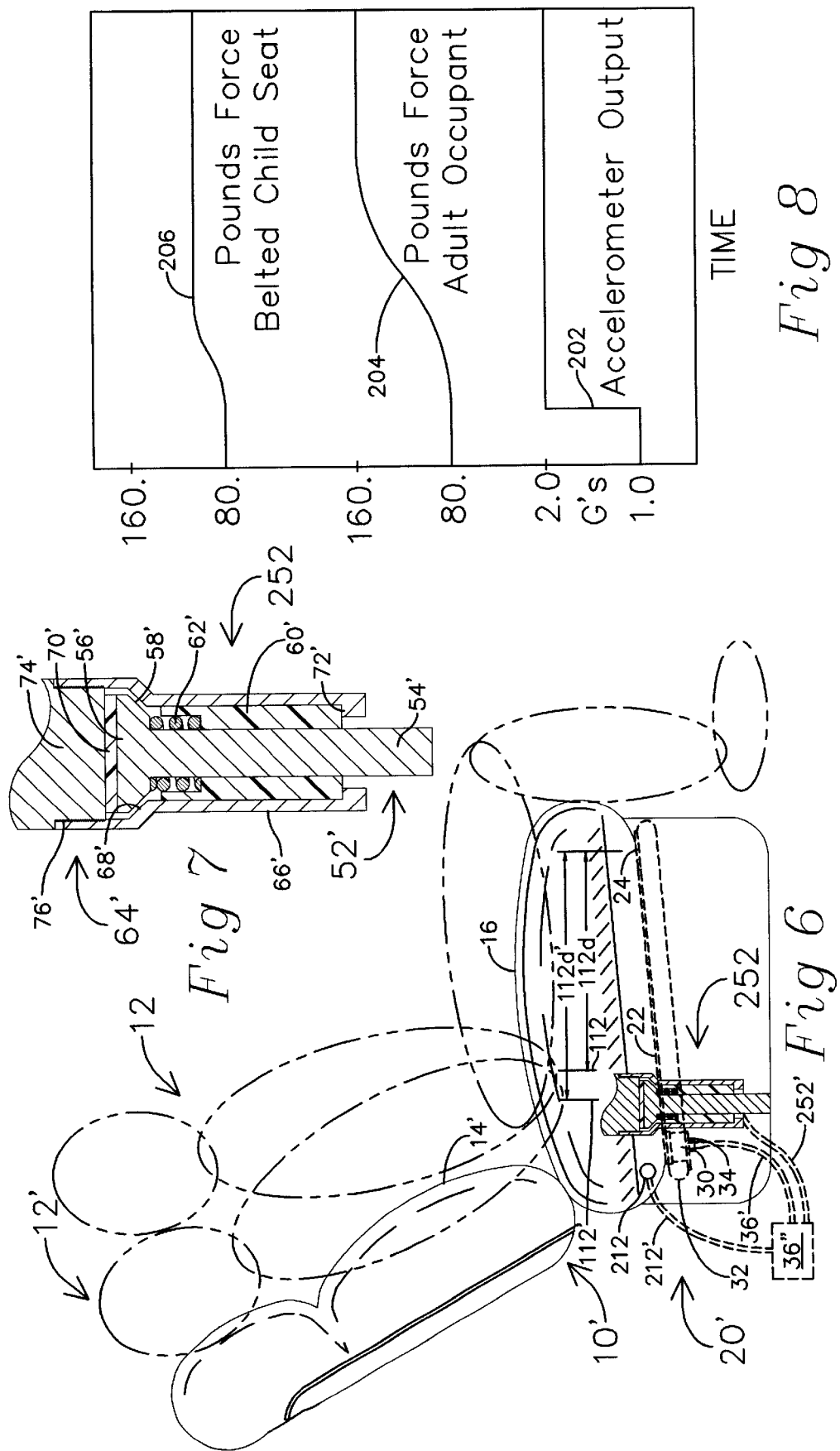

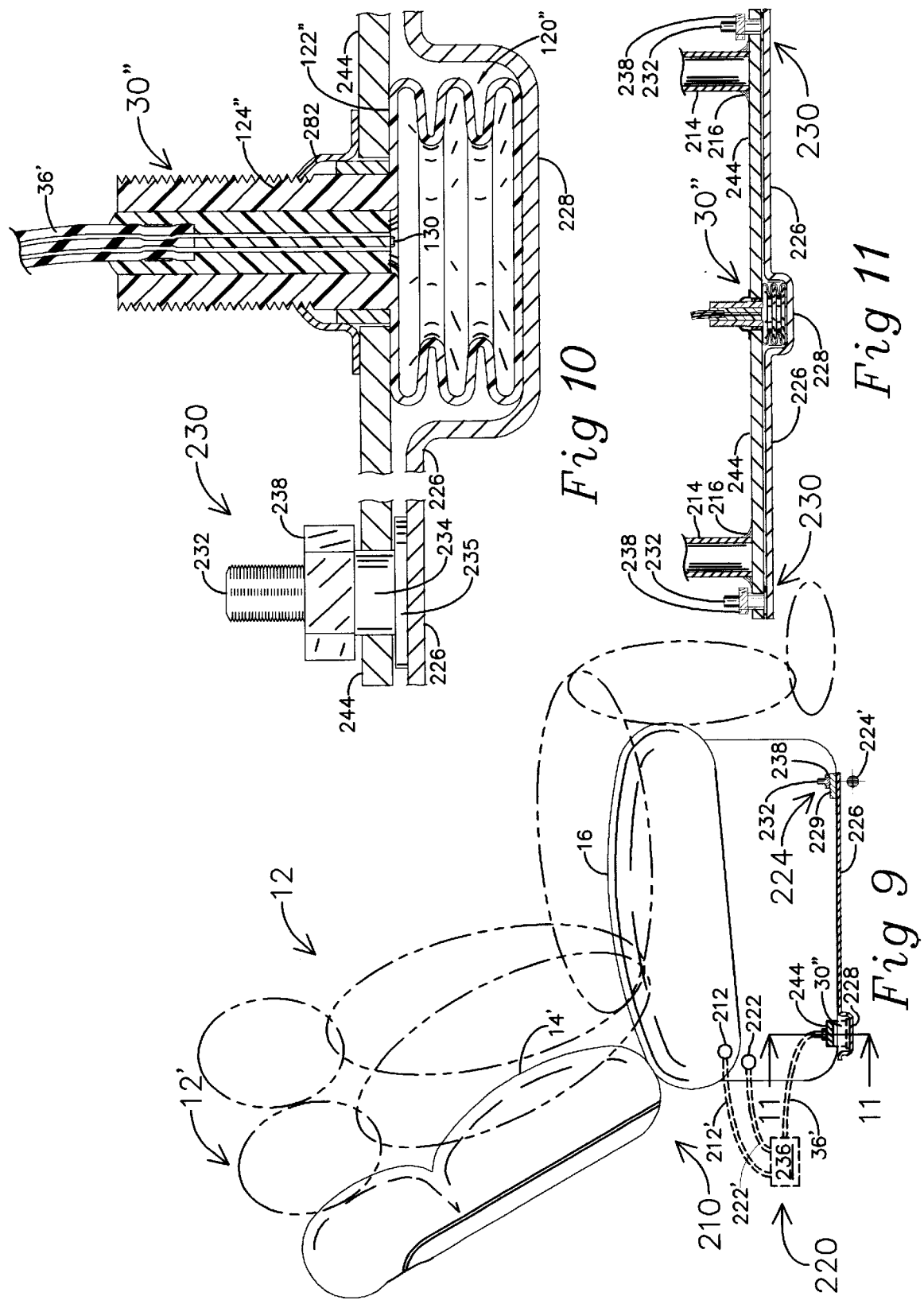

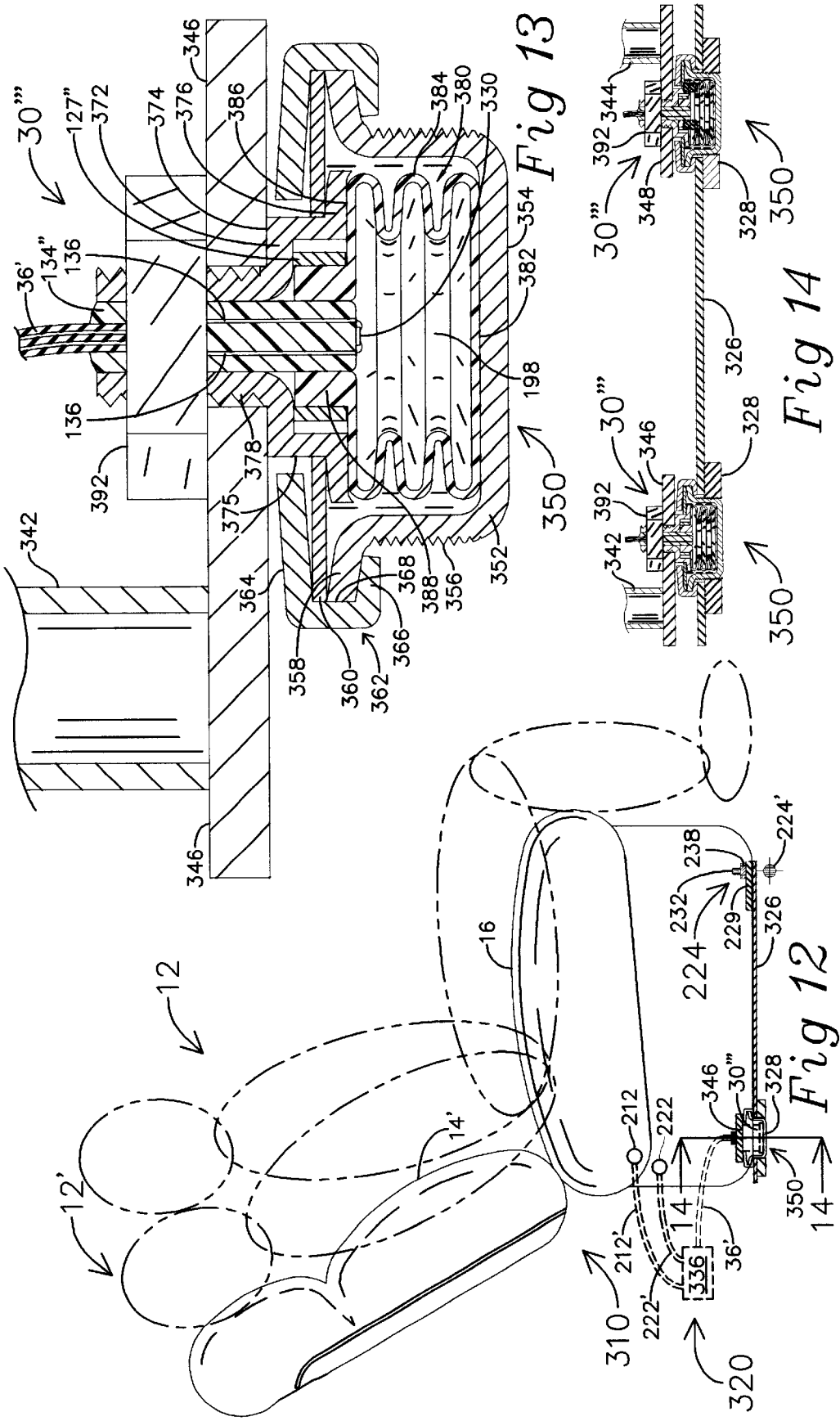

SEAT OCCUPANT WEIGHT SENSING SYSTEM

This is a continuation-in-part of application Ser. No. 09/081,194 filed May 19, 1998 now U.S. Pat. No. 6,224,094 and titled *FORCE SENSOR FOR SEAT OCCUPANT WEIGHT SENSOR*.

This is also a continuation-in-part of application Ser. No. 09/112,727 filed Jul. 9, 1998 now U.S. Pat. No. 6,259,167 and titled *SEAT OCCUPANT WEIGHT SENSING SYSTEM*.

FIELD OF THE INVENTION

This invention relates to systems that ascertain what is occupying a vehicle seat for the purpose of deciding if and how air bags should be deployed.

BACKGROUND OF THE INVENTION

Air bags of occupant protection systems are expensive and in certain circumstances are dangerous. It is therefore desirable to prevent deployment when the seat is empty to save the cost of replacement. It is important to prevent deployment when circumstances do not warrant deployment or when deployment might do more harm than good. When the seat is occupied by a child or by a very small adult it is particularly important to deploy the airbag judiciously. A system is desired that can reliably distinguish a 100 pound adult from a 60 pound child in a child seat even when the belts retaining the child seat are under substantial tension.

Occupant protection systems typically include a "sensor and diagnostic module" or "SDM" which performs various functions related to sensing the occurrence of a vehicle crash, monitoring various elements of the occupant protection system for proper operation and initiating deployment of occupant protection devices. SDM's typically include a microprocessor, an accelerometer, an arming sensor, circuitry interconnecting the aforementioned components and switches for initiating deployment of the occupant protection devices. SDMs are often connected to receive input from such as side mounted and forward mounted crash sensors.

Many systems are known that sense properties of the occupant of a seat. Certain of these systems contain elements for weighing the occupant. If the weight is very small it may be assumed that the seat is unoccupied or occupied by a small child, and in either case deployment would not be desired. If the weight is intermediate, say between 25 and 40 kilograms, then the occupant is likely to be a child and whether or not an airbag should be deployed depends on factors such as how energetically the airbag deploys. If the weight is greater than 45 kilograms the seat occupant is likely to be an adult who would be protected by an airbag.

Three types of weight sensing systems for installation in vehicle seats are known: A first type of weight sensing system comprises an array of force sensors located immediately beneath the upholstery material of the seat cushion which operates to measure the pressure of the occupant against the seat at the points where sensors are located. These sensors are typically responsive to small forces applied over a small area and an array of force sensors tells a microprocessor the magnitude and distribution of the force the occupant applies to the cushion. The microprocessor ascertains the weight and other characteristics of the seat occupant from the information provided by the array of force sensors.

A second type of weight sensing system is useful in the type of seat having a fabric covered seat cushion of a foam of a rubbery material supported by a platform. The second type of weight sensing system includes, typically, four force sensors located at the four corners of the platform between the platform and the frame of the seat. The outputs of the four sensors are added to ascertain the total weight being supported by the platform and, therefore, by the seat cushion.

A third type of weight sensing system comprises sensors for sensing stress in structural members of the seat. For example, a chair with a force sensor sensing the weight carried by each leg. The outputs of the four (in the case of the example) sensors are added to ascertain the total weight of the occupant.

The known embodiments of the aforementioned weight sensing systems do not always measure the occupant's weight accurately and no design is widely accepted. Where the seat belts are attached to the structure of the vehicle, all of the aforementioned weight sensing systems may provide weight readings for a tightly belted child seat that are indistinguishable from weight readings from an adult.

Additionally, all known embodiments of the aforementioned weight sensing systems attempt to measure the total occupant weight but do so with a large margin of error because the feet of most normally seated adults (but not of children and very small adults) rest on the floor so that some of the weight is not sensed.

Force sensors placed immediately beneath the seat upholstery complicate manufacture and may affect the feel of the seat as sensed by the occupant.

Load cells comprising a piston sealingly movable in a cylinder to generate hydraulic pressure are well known. In certain applications there is a need for a load cell that responds to both tension and compression. A sensor based on a piston sealingly movable in a tube must be preloaded with such as spring under tension or compression to maintain a pressure in the liquid that diminishes when tension is applied to the load cell. Known means for providing spring force disadvantageously respond to changes in temperature because liquids typically have larger thermal expansion coefficients than metals which causes the deflection of the spring and therefore the spring force to vary with temperature.

Another disadvantage of load cells comprising a piston sealingly movable in a cylinder is friction between the piston and the cylinder which results from side forces that can result from many causes. Commonly encountered causes are forces caused by differential thermal expansion between the car floor and the seat, relative movement as the seat is being attached to the vehicle, damage to the seat or the car floor and forces resulting from acceleration of the vehicle or actions of the seat occupant. It is particularly important to isolate the piston from angular misalignment between seat parts and car floor parts that occur because of production variations in the parts. A load cell is needed that is inherently insensitive to side forces and angular misalignments.

Seat occupant weight sensing systems responsive to stress in the seat structure must respond only to forces related to the weight of the seat occupant and not to stresses resulting from thermal expansion or attachment to the vehicle. This is not always easily achieved. However, force sensors mounted on the seat structure solve the aforementioned problem of belt forces causing a child to appear to be an adult: By anchoring the seat belts to the seat and placing the force sensors below the belt anchors the belt forces are not included in the weight.

Load cells responsive to applied force by pressurizing a liquid to which a pressure sensor responds may include an absolute pressure sensor. Absolute pressure sensors advantageously are less expensive to manufacture and allow the load cell to be closed to prevent penetration of fluids during events such as flooding or fluid spillage. The output of a load cell comprising an absolute pressure sensor responds to changes in atmospheric pressure. A change in output as a car is driven from sea level to Denver, Colo. will occur and might be on the order of three to ten pounds change in the force sensed by each load cell.

The type of sensor wherein the weight of an occupant sitting on a cushion is transmitted though the cushion and sensed at the platform supporting the cushion may fail to register an accurate weight because a fraction of the occupant's weight may be supported by the back of the seat rather than on the seat cushion and, therefore, not be sensed. Also, the fraction of the occupant's weight supported by the seat back varies with the angle to which the back is reclined.

Seat backs that can recline typically expose a larger area of cushion at greater seat back recline angles. This causes the weight of the head and body of an occupant to be applied farther toward the rear of the seat cushion when the seat. back is reclined.

Semiconductor pressure sensors are manufactured in large quantities by micromachining silicon wafers. Designs are based on various technologies and physical principles. Many of these sensors require additional circuitry to achieve a useful function. Typically, an integrated circuit complements the micromachined pressure sensing element. Certain of these sensors are suitable for operation submersed in liquid and operate by sensing the pressure in the liquid. Absolute pressure sensors are typically less expensive than gauge sensors because there is no need to provide a channel connecting the inside of the diaphragm to the atmosphere. Absolute pressure sensors also simplify the design of a load cell based on a semiconductor pressure sensor because it is not necessary to provide a duct from the semiconductor pressure sensor to the outside atmosphere.

Accelerometers responsive to accelerations between plus and minus one or two times the acceleration of gravity are readily available from several suppliers. One supplier is Entran Devices, Inc. of Fairfield, N.J.

Seats in commercial production often include sensors indicating the position of the seat on its track and the amount that the back of the seat is reclined.

Injection stretch blow molding is a highly developed technology for making beverage containers. By this process a hollow piece of injection molded plastic is heated and placed in a form after which an air nozzle extends into the form to stretch it and pressurized air forces the stretched plastic to conform to the mold. This method is sometimes used to make bottles with sides shaped like bellows to stretch like the bellows of an accordion to vary the capacity of the bottle.

It is well known to connect a sensor using only two electrical conductors. In typical systems the sensor simultaneously draws power needed to operate and also draws pulses of current over and above the current required to operate. The width, magnitude or pattern of the pulses indicates the physical measurement.

By the rules of Physics torque is a vector quantity defined with reference to a force and an axis. A torque about an axis is caused by a force (a vector quantity) applied along a line that does not intersect the axis. The torque (also a vector quantity) is the vector product of the force vector and a distance vector from the axis to the line along which the force vector is applied. In the apparatus of the invention only the scaler magnitude of the torque vector is measured and, hereinafter, it is called "torque". Hereinafter, "torque" about an axis resulting from an applied force vector is defined to be the product of the length of the line from the axis to the force vector that is perpendicular to both the axis and the force vector multiplied by the component of the force vector perpendicular to both the axis and the line.

Belleville springs are washers dished into a slightly conical shape. Certain Belleville springs are called "constant force springs" because the force required to compress the spring is largely independent of the compression over a range of compression distances. The constant force nature of these Belleville springs is often used to maintain a constant spring force in a mechanism where relative movement of parts of the mechanism would cause the force provided by most other spring designs to vary. Belleville springs having a dish height to thickness ratio of about 1.4 are constant force springs when they are compressed to flatness. Belleville springs having dish height to thickness ratios greater than 1.4 have a constant force region of compression at compressions to less than to flatness.

Child seats are made in three types. Infant seats are mounted in a rear facing orientation and are typically intended for infants weighing less than 18 pounds. Child seats are mounted in a forward facing direction and provide cushioned seat cushion and seat back surfaces that are located about three inches away from the vehicle seat cushion and seat back surfaces respectively. They are typically intended for children weighing 18 and 40 pounds but some designs may be mounted in a rear facing orientation for use as an infant seat. The first two types are anchored by the vehicle seat belts which pass through openings in the child seat which keep the vehicle seat belts away from the child and enable the belts to be highly stressed to firmly attach the child seat to the vehicle seat. The first two types of child seat provide their own belts for restraining their occupant. The third type uses the vehicle seat belts to restrain the child and some are intended for children weighing as much as 60 pounds. In the case of the third type the vehicle belts directly or indirectly apply force to the child which makes operation with a large belt tension unlikely because the large force would cause the child discomfort.

Copending application Ser. No. 09/081,194 describes a load cell for generating an electric signal indicating the force applied to the load cell. It has a pressure sensor and a means for converting applied force to pressure whereby it becomes a force sensor. It is preloaded with a constant force spring whereby relative thermal expansion between the liquid and the structural parts of the load cell does not cause the pressure in the liquid to vary. The constant force spring also provides a low friction bearing in the axial direction and resists radial movement between two parts of the load cell.

In vehicle manufacturing there are variations in the orientations of both the parts of the vehicle to which seats are attached and in the parts of the seats that attach to the vehicle. Copending application Ser. No. 09/081,194 describes a load cell for sensing seat occupant weight wherein a constant force spring accommodates angular misalignment between seat elements and vehicle elements that normally occur as a result of manufacturing processes.

Copending application Ser. No. 09/112,727 describes a seat occupant weight sensing system based on torque sensed at the cushion of a seat and two seat occupant weight sensing systems based on torque sensed at the frame of the seat. The seat occupant weight sensing systems it describes are similar in many ways to the system of the present invention except that in FIGS. 11, 12 and 13 ball bearings are used to obtain a low friction bearing and in the present application FIG. 12, 13 and 14 which correspond with FIGS. 11, 12 and 13 in application Ser. No. 09112,727 illustrate using a Belleville spring to obtain the low friction bearing in the manner disclosed in the aforementioned copending application Ser. No. 09/081,194.

Copending application Ser. No. 09/112,727 also discloses a force sensor comprising a liquid filled injection stretch blow molded bottle having bellows shaped sides and a pressure sensor whereby the bottle becomes a force sensor responsive to axial force converted to pressure in the liquid and sensed by the pressure sensor.

A general object of this invention is to provide a seat occupant sensing system offering low cost and superior performance and also to provide a force sensor that is particularly adapted for sensing force derived from the weight of a seat occupant which also overcomes certain disadvantages of the prior art.

SUMMARY OF THE INVENTION

In accordance with a first embodiment of the invention, a seat occupant weight sensing system comprises a platform hinged near the front of the seat and supported by a force sensor near the rearmost part of the platform. The force sensor is, therefore, responsive to torque applied to the platform by a seat occupant.

Further, in accordance with the aforementioned first embodiment of the invention, the seat occupant weight sensing system is particularly responsive to weight applied to the rearward part of the seat and is less responsive to weight applied near the forward edge of the seat thereby being less affected by the weight of the lower legs and feet of a normally seated adult and more responsive to the weight of the torso which is the part of the occupant that is to be cushioned by an airbag. Thereby, any inaccuracies in the measured weight are less relevant to deploying an airbag than inaccuracies in the measured weight from a weight sensing system that is more affected by weight applied by the occupant's feet to the vehicle floor.

Further, in accordance with the aforementioned first embodiment of invention, the hinge extends horizontally and transversely to the vehicle axis whereby the axis of rotation of the platform is near the front of the seat.

Further, in accordance with the aforementioned first embodiment of the invention, a seat back recline indicator enables calculating the occupant weight from the torque and recline angle thereby correcting for weight supported by the seat back. In certain cases of large recline angle the recline angle may dictate that the occupant is located where it would not be useful to deploy an airbag.

Further, in accordance with the aforementioned first embodiment of the invention, the more rearward position of a normally seated occupant when the seat back is somewhat reclined partially or approximately compensates for the downward force the occupant applies to the seat back when the seat back is reclined.

Further, in accordance with a second embodiment of the invention, torque applied to the frame of the seat is measured. A seat back recline sensor and a seat track position sensor provide information that enables calculating the occupant weight from the observed torque thereby enabling determination of occupant weight with only one force sensor. This embodiment may add little cost over the cost of a seat without a force sensor because many seats incorporate a track position sensor and a seat back recline sensor for other purposes. In certain cases the combination of the seat back recline angle and the seat track position may indicate that the seat occupant is located where airbag deployment might not be useful.

Further, in accordance with the invention, the force sensor comprises means for converting force to hydraulic pressure and a pressure sensor provides an electric signal indicating the hydraulic pressure.

Further, in accordance with the invention, a force sensor comprises a tubular neck sealingly accommodating a cylindrical plastic feedthrough having insert molded electrical conductors and a pressure sensor mounted on an end.

Further, in accordance with the invention, the aforementioned force sensor also comprises a piston having a rounded protrusion and further comprises a cover having a protrusion mating with said protrusion and a retaining lip whereby the number of parts and the cost are minimized.

Further, in accordance with the invention, a second embodiment of the aforementioned force sensor comprises an injection stretch blow molded bottle with bellows shaped walls and a neck sealed to the aforementioned cylindrical plastic feedthrough having insert molded electrical conductors and a pressure sensor mounted on an end.

Further, in accordance with the aforementioned second embodiment of the force sensor of the invention the neck of the blow molded bottle is formed with threads using the technology used to form the threads on the neck of a soda bottle and the aforementioned cylindrical plastic feedthrough is formed in the shape of a cap of a soda bottle with mating threads with which it is sealingly attached to the injection stretch blow molded bottle thereby using the same technology that is used to seal the caps onto soda bottles.

Further, in a variation of the aforementioned second embodiment of the force sensor of the invention, the force sensor is preloaded by a constant force Belleville spring. The Belleville spring also prevents radial movement between a part of the force sensor attached to a seat frame and a part of the force sensor attached to the vehicle while allowing axial relative movement between the two parts. Advantageously, the axial movement is substantially free of friction. Also advantageously, some angular misalignment between the part of the vehicle floor to which the seat attaches and the part of the seat that is attached to the vehicle can be accommodated by twisting of the Belleville spring.

Further, in the aforementioned variation of the aforementioned second embodiment of the force sensor of the invention, a clamp prevents separation of the part of the force sensor attached to a seat frame and the part of the force sensor attached to the vehicle thereby preventing the seat from moving upward during violent movement such as occurs on a rough road or during a crash.

Further, in accordance with the invention, two or more force sensors are connected with a microprocessor which adds the outputs of the force sensors to calculate the total force.

Further, in accordance with the invention, an atmospheric pressure sensor informs the microprocessor of the atmospheric pressure which enables the pressure sensors of the force sensors to be absolute pressure sensors and enables the microprocessor to correct for variations in the outputs of the force sensors caused by variations in atmospheric pressure.

Further, in accordance with the invention, changes of the readings of the force sensor are compared with changes of vertical accelerations measured by an accelerometer for ascertaining if the seat contains a child seat.

Further, in accordance with the invention, a switch responsive to a predetermined seat belt tension is provided that closes when the seat belt tension is so great it would be uncomfortable to a human and therefore indicates that the seat is being occupied by a tightly belted child seat.

Further, in accordance with the invention, a sensor responsive to seat belt tension is provided that enables calculating the weight of the seat occupant in the case when seat belt tension is significant.

A complete understanding of this invention may be obtained from the description that follows taken with the accompanying drawings.

DESCRIPTION OF THE DRAWINGS

FIG. 1 shows a vehicle seat with a first embodiment of the occupant weight sensing system of the invention illustrated by hidden lines.

FIG. 2 shows a side view of the vehicle seat illustrated in FIG. 1 with the occupant weight sensing system of the invention again illustrated by hidden lines and a human occupant suggested by 5 ellipses in phantom lines.

FIG. 3 shows the platform of the seat occupant weight sensing system of the first embodiment of the invention with part of the seat frame and with the force sensor and the shelf supporting it indicated by hidden lines.

FIG. 4 shows the force sensor with other elements of the first embodiment of the occupant weight sensing system of the invention partially in section taken at section 4—4 of FIG. 3.

FIG. 5 shows a hinge of the first embodiment of the occupant weight sensing system of the invention with part of the frame of the seat partially in section taken at section 5—5 of FIG. 3.

FIG. 6 shows a side view of the seat illustrated in FIG. 2 with the seat back reclined fifteen degrees from the position illustrated in FIG. 2 and including a seat belt tension indicating switch.

FIG. 7 shows an enlarged view of the seat belt tension sensing switch illustrated in FIG. 6.

FIG. 8 shows graphs of data from the seat occupant weight sensing system of the invention that enables distinguishing between a seat containing an adult human and a seat containing a tightly belted child seat.

FIG. 9 shows a side view of a seat with the second embodiment of the occupant weight sensing system of the invention partially in section taken in the vertical plane of the center of the seat.

FIG. 10 shows partially in section enlargements of the rear seat anchor and the force sensor of the second embodiment of the occupant weight sensing system of the invention illustrated in FIG. 9.

FIG. 11 shows partially in section part of the seat frame and the force sensor of the second embodiment of the occupant weight sensing system of the invention taken at section line 11—11 of FIG. 9.

FIG. 12 shows partially in section a variation of the second embodiment of the occupant weight sensing system of the invention wherein the seat has two force sensors each preloaded by a Belleville spring.

FIG. 13 shows partially in section an enlargement of part of the aforementioned variation of the second embodiment of the occupant weight sensing system of the invention illustrated in FIG. 12.

FIG. 14 shows partially in section part of the seat frame and two force sensors of the aforementioned variation of the second embodiment of the occupant weight sensing system of the invention taken at section line 14—14 of FIG. 12.

BEST MODE FOR CARRYING OUT THE INVENTION

Figure 15:
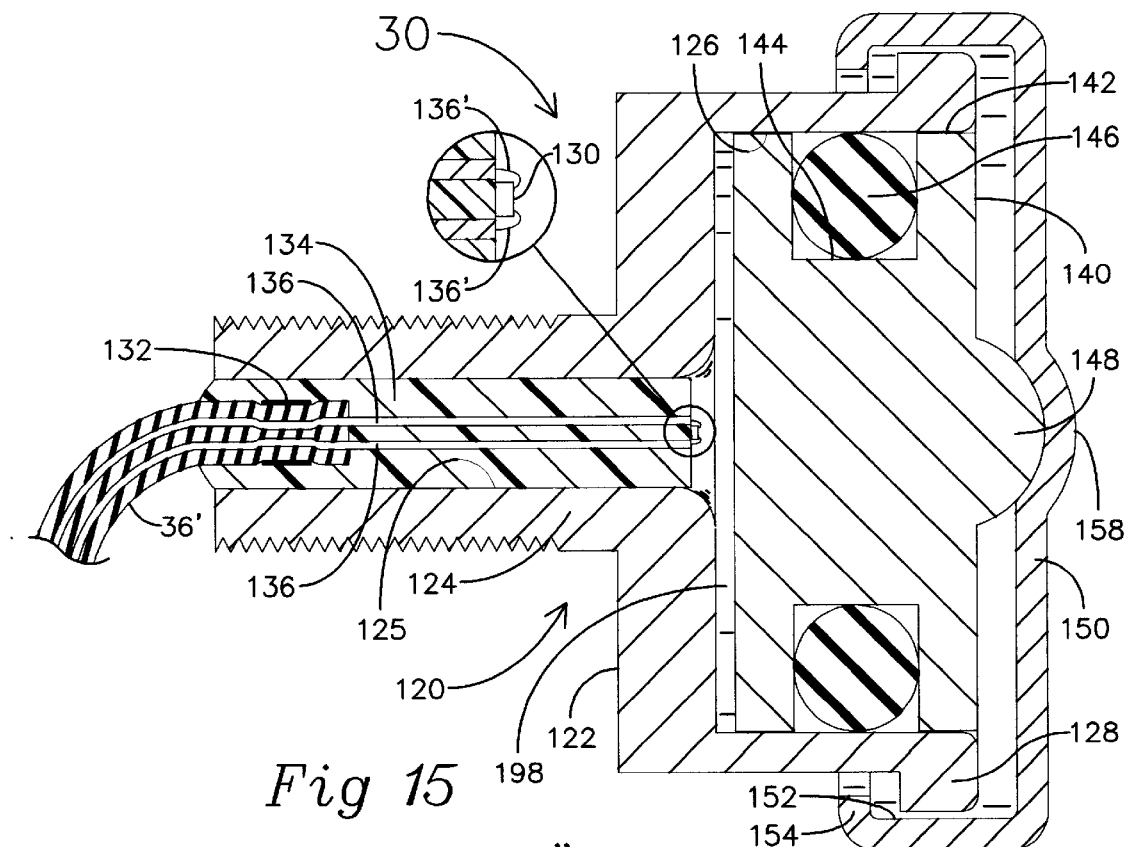
FIG. 15 shows a force sensor wherein force is converted to hydraulic pressure and hydraulic pressure to an electric signal for measuring force or torque in the occupant weight sensing system of the invention.

Proceeding first with reference to FIGS. 1 and 2, a vehicle seat 10 is occupied by an occupant 12. The seat 10 is equipped with an occupant weight sensing system 20 for ascertaining the weight of the occupant. The occupant 12 is suggested by five ellipses drawn with phantom lines. The occupant weight sensing system 20 is illustrated by hidden lines. The occupant weight sensing system 20 comprises a platform 22 that receives force from the occupant through cushion 16 and a force sensor 30 responsive to downward force between the rearward edge of platform 22 and a shelf 34 fixed to the frame 32 of the seat. The occupant weight sensing system 20 also comprises processing unit 36 which includes a microprocessor and may include an accelerometer responsive to vertical acceleration and an atmospheric pressure sensor. Processing unit 36 is preferably combined with an SDM into one package and, preferably, sharing one microprocessor. If processing unit 36 and the SDM are not unitary then there is an electrical connection between processing unit 36 and the SDM for communicating information therebetween. Because platform 22 is hinged at one edge and force is measured at the opposite edge, occupant weight sensing system 20 measures torque applied to platform 22 about hinges 24 and 26. Because the horizontal distance from the occupant's torso to the hinge is greater than the distance from the occupants legs to the hinge, occupant weight sensing system 20 indicates a larger torque in response to a weight in the head or torso of the occupant than it indicates in response to the same weight in the lower thighs, lower legs and feet. It will be appreciated as the description proceeds that the invention may be implemented in different embodiments.

Continuing now the description of occupant weight sensing system 20 with particular reference to FIGS. 1 through 5, occupant weight sensing system 20 comprises platform 22 for supporting cushion 16. Platform 22 is preferably made of sheet steel and may be rigid by virtue of its thickness as illustrated or may have ribs or other shapes (not illustrated) stamped into it to achieve rigidity with less material and lower weight. Hinges 24 and 26 are preferably unitary with platform 22 and function as hinges by flexing. Hinges 24 and 26 are attached by welds 24' and 26' to structural frame member 32 of seat 10. Other materials and manufacturing methods suitable for platform 22 and hinges 24 and 26 may be substituted by those skilled in the relevant arts.

Force sensor 30 provides an electrical signal through electrical cable 36' to processing unit 36 that indicates the force applied to force sensor 30. Force sensor 30 is attached by threaded nut 38 to shelf 34. Shelf 34 is preferably a piece of sheet steel attached by weld 34' to structural frame member 32 of the seat. Preferred force sensors comprise means for pressurizing hydraulic fluid in proportion to applied force and a pressure sensor for providing an electrical signal responsive to pressure but any force sensor known by those skilled in the art of force measurement may be substituted. Force sensor 30 indicates force applied by platform 22 at a known distance from binges 24 and 26 and, therefore, indicates the torque about hinges 24 and 26 applied by cushion 16 to platform 22. Force sensor 30 may be any suitable force sensor selected by those skilled in the relevant arts. Two suitable force sensor designs. are described hereinafter with reference to FIGS. 15 and 16.

A table is stored in the memory of the microprocessor of processing unit 36 containing data for it to use to determine the weight of the occupant from the outputs of the sensor 30. The table entries are based on the outputs of a large number of readings from force sensor 30 from a large sampling of adults and children sitting in seat 10. Enough data are taken to establish a relationship between the weight of the person in the seat and the output of sensor 30.

The following example illustrates by generating a two element table the process for generating the table described in the preceding paragraph. With a 60 pound child in seat 10 a force reading of 39 pounds is taken. With a 120 pound adult a force reading of 64 pounds is taken. With a different 120 pound adult in seat 10 a reading of 72 pounds is taken. The different readings might result from the second 120 pound occupant having more weight concentrated in the abdomen and less in the lower thighs and legs than the first. To minimize the microprocessor effort, a mean value based on all tested persons of the same weight is entered into the microprocessor memory instead of entering separate data for each person of a given weight. The resulting two entry table indicates a 39 pound reading implies a 60 pound occupant and a 68 pound reading (the average of 64 and 72) implies a 120 pound occupant. The forces in the above example are expressed in pounds but any force units could be used and the process would be the same.

Instead of storing a table in the memory of the microprocessor of processing unit 36, parameters may be stored that define a predetermined function that approximates the relationship between the output of force sensor 30 and the weight of the occupant. A function may be preferred over a table because a function may require only a few such as three to five parameters whereas a table may require a large number such as one hundred table entries to be stored. For example, in the following expression X represents the output of force sensor 30 in pounds, Y represents the estimated occupant weight and exp is the exponential function:

$$Y \text{ (occupant weight)} = A*(1-\exp(-(X/C)^2)) + B*X$$

If the parameters are set to A=−40 pounds, B=2.34 and C=0.8 pounds the expression evaluates to 0 pounds at X=0; 60 pounds at x=39 pounds and 120 pounds at x=68 pounds which demonstrates evaluation of a function replacing a table lookup by generating the data in the table described hereinabove.

It is evident that the two aforementioned methods (table lookup and parameterized function) for obtaining the weight of a human in seat 10 provide less accurate weight measurements than other weighing methods such as using an inexpensive bathroom scale. However, the accuracy should be compared with the accuracy of the known methods for weighing the occupant of a vehicle seat which are also inaccurate because the weight of the lower thighs, lower legs and feet are partially omitted. Also, similar errors in the aforementioned methods and the known methods are not comparable (although they may be comparable in numerical magnitude) because the errors in weight estimated by occupant weight sensing system 20 are correlated with variations in the weight of the torso of the human in seat 10 with larger readings resulting from a heavier torso. This is advantageous because a person with a heavier torso should be treated by the SDM like a heavier person because more airbag force is needed to resist forward movement of the torso. Known seat occupant weighing systems offer no comparable advantages. An inaccurate weight from omitting an unknown fraction of the weight of the lower thighs, lower legs and feet does not lead to better airbag performance.

The materials referred to hereinabove are only suggestions and other materials may be selected by those skilled in the relevant arts.

The operation of the seat occupant weight sensing system 20 of the invention will now be described with reference to FIGS. 1 through 5. In operation of the system, when seated occupant 12 applies force to seat cushion 16 the force is transmitted by cushion 16 to platform 22. The weight of the head, torso and upper thighs of occupant 12 applied through seat cushion 16 is concentrated near the rear edge of platform 22 therefore applying a substantial torque to platform 22 about the axis of hinges 24 and 26. Simultaneously, some fraction (which can be zero because of the weight supported by the vehicle floor) of the weight of the lower thighs, lower legs and feet of occupant 12 applied through seat cushion 16 is concentrated closer to the forward edge of platform 22 thereby adding little or no torque to the aforementioned torque from the weight of the head, torso and upper thighs. The lower thighs, lower legs and feet contributes only a small torque regardless of the weight applied to the vehicle floor because the torque is the product of weight and the small distance from the axis of the hinges 24 and 26 and is even smaller when some of that weight is applied to the vehicle floor.

Therefore, the torque applied to platform 22 is substantially caused by application of the weight of the head, torso and upper thighs of seat occupant 12 through cushion 16 to platform 22. The torque causes platform 22 to rotate very slightly about hinges 24 and 26 and apply force to force sensor 30. Force sensor 30 responds by transmitting a signal through cable 36' to processing unit 36 indicating the force being applied to force sensor 30. If force sensor 30 is of the type that comprises an absolute pressure sensor and processing unit 36 contains an atmospheric pressure sensor the microprocessor of processing unit 36 subtracts the atmospheric pressure from the pressure inside force sensor 30 and multiplies the difference by a characteristic area of force sensor 30 to compute the force at force sensor 30. The microprocessor of processing unit 36 may use a table like the table described hereinabove to estimate the weight of the occupant of seat 10 or it may use a parameterized function like the one shown hereinabove to obtain the weight of the occupant of seat 10. Processing unit 36 may combine the information from force sensor 30 with other information such as vertical acceleration and information about seat belt tension to more accurately determine the weight of the seat occupant particularly in the case when the seat contains a tightly belted child seat as is described with reference to FIGS. 6 through 8 hereinbelow.

Proceeding now to with particular reference to FIG. 6, seat occupant weight sensing system 20' comprises processing unit 36" connected through cable 36' with force sensor 30, through cable 212' with seat back recline sensor 212 and through cable 252' for determining if force sensing switch 252 is closed. The parts of seat occupant weight sensing system 20' that are likely to be hidden underneath the seat fabric are illustrated by hidden lines. Seat 10' is different from seat 10 by having seat back recline sensor 212 for indicating the recline angle of back 14' of seat 10'. Seat back recline sensor 212 may be any of the known sensors conventionally installed on vehicle seats or known to be suitable by those skilled in the relevant arts for sensing seat back recline. Processing unit 36" includes a microprocessor and may include an accelerometer responsive to vertical acceleration and an atmospheric pressure sensor. Back 14' of seat 10' is reclined about an axis through seat back recline sensor 212 fifteen degrees from the position of seat back 14 of seat 10 illustrated in FIG. 2. Occupant 12 is illustrated in the occupant position illustrated in FIG. 2 and occupant 12' is illustrated in the position appropriate when the seat back 14' is reclined the additional fifteen degrees illustrated in FIG. 6. Lines 112 and 112' mark respectively where the weights of the torsos of occupants 12 and 12' can be considered to be concentrated and 112*d* and 112*d'* are distances from the rotation axis of hinges 24 and 26 to the points of effective force concentration.

When the seat back 14' is reclined as illustrated in FIG. 6 the weight of occupant 12' is applied through seat cushion 16 and centered at distance 112*d'* from the axis of rotation of hinges 24 and 26. When the seat back 14 is less reclined as illustrated in FIG. 2 the weight of occupant 12 is applied through seat cushion 16 and centered at distance 112*d* from the axis of rotation of hinges 24 and 26. Distance 112*d'* is typically greater than distance 112*d*. Therefore, a weight applied at distance 112*d'* will cause a greater torque as sensed by force sensor 30 about hinges 24 and 26 than an equal weight will cause if applied at distance 112*d*.

In the reclined seat back position illustrated in FIG. 6 some of the weight of the occupant 12' might be supported by the back 14' of seat 10' whereas in the position illustrated in FIG. 2 little or none of the weight of the occupant 12 is likely to be supported by the back 14 of seat 10. In the reclined seat back position illustrated in FIG. 6 the torque applied by occupant 12' through seat cushion 16 to platform 22 and sensed by force sensor 30 results principally from the weight of the head and torso of occupant 12' reduced by any weight supported by the back 14' of seat 10' multiplied by the distance 112'. In the less reclined seat back position illustrated in FIG. 2 the torque applied by occupant 12 through seat cushion 16 to platform 22 and sensed by force sensor 30 results principally from the weight of the head and torso of occupant 12 multiplied by the distance 112.

It is now also apparent by referring to FIGS. 2 and 6 that torque measurement is advantageous because it compensates to some degree for the greater weight supported by reclined seat back 14' relative to the weight supported by seat back 14 which is not reclined because of the greater distance 112' at which occupant weight is applied when the seat back 14' is reclined. Therefore, for a given occupant the torque indicated by force sensor 30 tends to be more constant for different recline angles of seat back 14', at least for modest recline angles.

Torque measurement is advantageous relative to measuring the total downward force applied to the seat. Firstly, torque measurement is primarily sensitive to the weight of the torso which is the part of the body that airbags interact with. Therefore torque is a measure of the quantity most relevant to deciding how forcefully the airbag should be deployed. Secondly, estimating the total weight of the occupant from total downward force applied to the seat is greatly affected by the unknown fraction of the weight of the thighs and lower legs being applied to the vehicle floor. Therefore, measuring the total downward force applied to the seat fails both by not measuring the most relevant quantity which is the weight of the torso and also by being an inaccurate measurement of occupant weight.

Thirdly, torque measurement is advantageous when the seat contains a child seat because it enhances the distinction between a child in a child seat and an adult. A forward facing child seat centers the child's weight several inches forward from where an adult's weight is centered. Therefore, the torque applied by the child in a child seat is less than the torque applied by a person of the same weight in the normal seated position. This is advantageous because it further distinguishes a child in a child seat from other occupants. The greater distinction between the two cases is advantageous because tension in the seat belts retaining the child seat operates to increase the apparent weight of the child with its child seat. The additional margin provides a greater separation whereby the apparent weight caused by seat belt tension does not make the cases of an adult and a child in a child seat overlap. Torque measurement is also advantageous in the case of a rear facing child seat because the child's weight is concentrated forward on the seat thereby applying little torque, at least if the seat is not tightly belted. A system for suppressing air bag deployment when occupant weight is low which also senses a low weight in the presence of a rear facing baby seat is advantageous because deployment is not desired when there is a baby in a rear facing baby seat.

A table is entered into the memory of the microprocessor of processing unit 36" containing data from which the microprocessor determines the weight of the occupant from the outputs of the sensors 30 and 212. The data in the table are based on the outputs of the sensors 30 and 212 for many different persons and several recline positions for each person. Enough data are taken to establish a relationship between the outputs of sensors 30 and 212 and the weight of the person in the seat. During operation, processing unit 36" looks into the table of data to find the occupant weight corresponding to the outputs of sensors 30 and 212.

The following illustrates generating an exemplary table based on occupant weight, seat back recline angle and torque (noting that the force sensed by force sensor 30 is a measure of torque applied to platform 22): With a 60 pound child at first, second and third seat back recline angles force readings of 42 pounds, 39 pounds and 27 pounds are taken. With a 120 pound adult at the first, second and third seat back recline angles force readings of 74, 64 and 49 pounds are taken. With a different 120 pound adult at the first, second and third seat back recline angles readings of 73, 62 and 43 pounds are taken. Such different readings could result if the second 120 pound adult has a longer torso and has more weight concentrated in the chest than the first 120 pound adult. To reduce the burden on the microprocessor, a mean value based on all tested persons of the same weight and at the same seat back recline angle are entered into the memory of the microprocessor instead of making a separate entry for each recline angle and each person. The resulting table contains six entries (1, 42, 60), (2, 39, 60), (3, 27, 60), (1, 73.5, 120), (2, 63, 120), (3, 46, 120). 73.5, 63 and 46 pounds are the averages of 74 and 73; 64 and 62; and 49 and 43 pounds respectively. The forces in the above example are expressed in pounds but any force units could be used and the process would be the same.

Instead of a table, a function of force sensed by force sensor 30 and seat back recline angle may be used to estimate the weight of a seat occupant. For example, in the following expression X represents the output of force sensor 30 in pounds and Y represents the estimated occupant weight.

$$Y \text{ (occupant weight)} = A*(1-\exp(-(X/C)^2)) + B*X$$

If the parameters are set to A=−85 pounds, B=3.225 and C=0.376 pounds the expression evaluates to 0 pounds at X=0; 60 pounds at x=39 pounds and 120 pounds at x=63 pounds which matches the table entries for the second seat back position. This demonstrates a function that enables replacing a table lookup based on the force sensor reading and the seat back recline with a function adapted for the second seat back recline value that provides weight estimates as a function of the force sensor reading which are equivalent to table lookup results. Many other ways of fitting data with parameterized functions will be evident to those skilled in the art of designing parameterized functions to fit experimental data.

The materials referred to hereinabove are only suggestions and other materials may be selected by those skilled in the relevant arts.

The operation of the seat occupant weight sensing system 20' of the invention will now be described with particular reference to FIG. 6 and, also, with reference to the exemplary six element table described hereinabove.

Assume that processing unit 36" receives a reading from seat back recline sensor 212 that seat back 14' is at the second seat back recline angle while receiving a force reading of 64 pounds from force sensor 30. Processing unit 36" finds the table entry closest to 64 pounds among those table entries for which seat back 14' is at the second recline angle which is 63 pounds. The code in the microprocessor of processing unit 36" assumes the occupant's weight is proportional to the reading of the force sensor for readings near the table entry. Therefore, the weight of the occupant is estimated by multiplying the occupant weight from the table entry which is 120 pounds by the ratio 64/63 to get 122 pounds. Other ways to relate readings from force sensor 30 and seat back recline sensor 212 to occupant weight will be evident to those adept in the art of processing analog input in digital computers.

Continuing with the assumption that processing unit 36" receives a reading from seat back recline sensor 212 that seat back 14' is at the second seat back recline angle while receiving a force reading of 64 pounds from force sensor 30 the aforementioned expression reproduced below offers a second way to estimate the occupant weight:

$$Y \text{ (occupant weight)} = A*(1-\exp(-(X/C)^2))+B*X$$

If the parameters are: A=−85 pounds, B=3.225 and C=0.376 pounds the expression evaluates to Y=123 pounds for X=64 pounds which is close to the value of 122 pounds obtained previously by using a table lookup algorithm.

It may happen that for certain seats and large seat back recline angles processing unit 36" cannot determine the weight of the seat occupant. In that case the microprocessor of processing unit 36" registers that it cannot ascertain the weight of the occupant of seat 10'. This is believed to be acceptable because instances of occupants of seats having very reclined backs are believed to require different handling by the SDM. More particularly, the cases of greatest concern are babies and children in infant or child seats and small people positioned close to a stored airbag. None of these cases is likely to be associated with a greatly reclined seat back.

Another way of viewing the aforementioned processes is that, instead of establishing categories of occupant weight for the purpose of deploying airbags optimally for each of the different categories of occupant weight, different categories of the combined weight of the head, torso and upper thighs of the occupant are being defined for the purpose of deploying airbags optimally for each of the different categories of the combined weight of occupant head, torso and upper thighs. It has been asserted hereinabove that this is advantageous because these are the parts of the occupant that the airbag engages and cushions during an accident. Measuring the combined weight of the head, torso and upper thighs instead of the weight of the whole person is facilitated by an occupant weight sensing system responsive to torque rather than downward force.

Proceeding now with particular reference to FIGS. 6 and 7, a force sensing switch 252 for a seat belt closes when seat belt tension exceeds a predetermined force such as 20 pounds. Force sensing switch 252 is connected with processing unit 36" by cable 252' whereby processing unit 36" sees an open circuit at cable 252' when force sensing switch 252 is open and a closed circuit when force sensing switch 252 is closed. One way to make the state of force sensing switch 252 evident to processing unit 36" is by providing a 1000 ohm resistor (not illustrated) from a voltage source connected so a voltage appears across switch 252 when it is open and not when it is closed. A continuing stress greater than 20 pounds indicates the seat contains a tightly belted child seat because such a high stress is uncomfortable to a person. Force sensing switch comprises anchor segment 52', force transmitting insulator 60', spring 62', latch carrier 64' and insulating pad 70'.

Anchor segment 52' comprises an extension 54' for attaching to the seat frame or vehicle floor and an enlarged head 56' with electrical contact surface 58'. Anchor segment 52' is preferably formed of steel rod and enlarged head 56' is may be formed by cold heading or any other process known to be suitable. Anchor segment 52' is attached near its lower extent by such as a bolt (not illustrated) to the vehicle structure or to the seat frame. Electrical contact surface is preferably plated with a rust resisting material such as nickel or chromium. Force transmitting insulator 60' is a sleeve made of a plastic such as fiber filled polyester for preventing electrical contact between anchor segment 52' and latch carrier 64' while transmitting force from spring 62' to ledge 72' of latch carrier 64'. Spring 62' is a conventional coil spring designed to resist upward movement of latch carrier 64' until an upward force such as 20 pounds is applied. Latch carrier 64' comprises sleeve 66' with ledge 72' for engaging insulator 60', electrical contact surface 68' and upper segment 74' for connecting to a seat belt or seat belt buckle latch (not illustrated). Upper segment 74' is attached to sleeve 66' by threaded attachment 76'. Insulating pad 70' is a disk of plastic such as polyethylene for electrically insulating head 56' of anchor segment 52' from upper segment 74' of latch carrier 64'.

The operation of the seat occupant weight sensing system of the invention will now be described with particular reference to FIGS. 6 and 7. During normal operation of the vehicle, spring 62' applies force to insulator 60' causing latch carrier 64' to remain in its low position illustrated in FIG. 7 wherein force sensing switch 252 is open because there is no electrical contact between contact surfaces 58' and 68'. For momentary periods lasting a few seconds during hard braking and on rough roads the seat belt (not illustrated) applies upward force to latch carrier 64' causing it to overcome the force of spring 62' and move upward which brings contact surfaces 58' and 68' together to close force sensing switch 252 for the aforementioned momentary periods. Processing unit 36" monitors the closure of force sensing switch 252 and, since it is momentary, takes no action. If a baby or child seat is tightly belted into seat 10' then the seat belt (not illustrated) applies a constant upward force to latch carrier 64' causing it to overcome the force of spring 62' and move upward which brings contact surfaces 58' and 68' together to close force sensing switch 252 and keep it closed indefinitely. Processing unit 36" monitors the closure of force sensing switch 252 and, if it remains closed for a long period such as twenty seconds, registers that seat 10' contains a tightly belted baby seat. Also, at initial power on if switch 252 is closed processing unit 36" register that seat 10' contains a tightly belted baby seat for as long as switch 252 remains closed.

Proceeding now with particular reference to FIG. 8, traces 204 and 206 illustrate the weight estimated by seat occupant weight sensing systems 20, 20', 220 or 320 of the invention while the seat encounters a change of vertical acceleration from zero to one times the acceleration of gravity. Trace 202 illustrates the output of a vertical accelerometer which indicates the vertical acceleration added to the acceleration of gravity. The weight estimated when the seat is occupied by an exemplary adult is illustrated by trace 204. The weight estimated when the seat is occupied by a child in a child seat tightly restrained by seat belts is illustrated by trace 206. The change in the estimated weight is much less in the case of the tightly restrained child seat than in the case of the adult human because the force applied to the seat by the adult human during vertical accelerations varies in proportion to the acceleration while the force applied to the seat by a tightly restrained child seat is largely caused by the belt tension and is less affected by vertical acceleration.

The operation of the seat occupant weight sensing systems 20, 20', 220 and 320 of the invention will now be described with particular reference to FIGS. 2, 6, 7, 8, 9 and 12. When power is first turned on and the vehicle engine is started, processing unit 36, 36". 236 or 336 receives a force reading from force sensor 30, 30" or 30'". In the case of processing units 36", 236 or 336 a seat back recline signal is received from seat back recline sensor 212. In the case of processing units 236 and 336 a seat track position signal is received from seat track position sensor 222. Processing unit 36, 36". 236 or 336 then determines the occupant weight from the sensor outputs by the processes described elsewhere herein with reference to FIGS. 2, 6, 9 or 12. If the weight is less than a predetermined weight then processing unit 36, 36", 236 or 336 immediately registers that the seat is not occupied and that the occupant protection system for that seat should not be deployed If the weight is larger than the aforementioned predetermined weight then processing unit 36, 36", 236 or 336 tentatively registers a seat occupant weight based solely on the output of force sensor 30, 30" or 30'", seat back recline sensor 212 if present and seat track position sensor 222 if present.

If a seat belt tension sensor sensing switch 252 is present, processing unit 36", 36", 236 or 336 continues its power up program by determining if force sensing switch 252 is closed If force sensing switch 252 is closed then processing unit 36", 36", 236 or 336 changes its previous decision and tentatively registers that seat is occupied by a child seat and that the weight of the occupant is unknown. It is likely that this determination is correct but there is a small probability that an adult passenger has tightened a seat belt unusually tight. This uncertainty is resolved by comparing the relative change of the output of a vertical accelerometer in the SDM with the relative change in the weight sensed by weight sensing system 20, 20', 220 or 320 described in the following paragraphs.

After the power up program is complete and the vehicle is operating the following two methods distinguish between an adult seat occupant and a child seat held by seat belts under such tension that force sensor 30, 30" or 30'" reading could indicate an adult.

As can be seen from FIG. 8, when there is no vertical acceleration the weight estimated by seat occupant weight sensing systems 20, 20', 220 or 320 does not enable distinction between an adult human and a child in a child seat. However, if processing unit 36, 36', 236 or 336 includes an accelerometer responsive to vertical accelerations, then, by remembering the weight estimated by the weight sensing system when there was no vertical acceleration and comparing the remembered weight with the weight when there is a vertical acceleration the microprocessor of processing unit 36, 36', 236 or 336 can distinguish between an adult human and a child seat tightly held by seat belts and assert the occupant is an adult human when the estimated weight varies approximately in proportion to the vertical acceleration as illustrated by trace 204 and assert the occupant is a belted child seat when the estimated weight varies much less than in proportion to the vertical acceleration as illustrated by trace 206.

As the vehicle is driven, as soon as an upward vertical acceleration occurs processing unit 36, 36", 236 or 336 compares the fractional change in vertical acceleration with the fractional change in the weight estimated by seat occupant weight sensing systems 20, 20', 220 or 320 (including seat weight in the latter two cases). If the ratio of the change in vertical acceleration to the acceleration of gravity and the ratio of the change in the weight estimated by seat occupant weight sensing systems 20, 20', 220 or 320 to the weight sensed prior to the acceleration are approximately the same, for example, agreeing to within ±10% then the microprocessor of processing unit 36, 36", 236 or 336 asserts that the seat occupant is a normally seated human and the weight is equal to the weight that was tentatively registered. If the ratio of the change in vertical acceleration to the acceleration of gravity is substantially greater than the ratio of the change in the weight estimated by seat occupant weight sensing systems 20, 20', 220 or 320 to the force sensed prior to the acceleration, for example twice or more as great, then the microprocessor of processing unit 36, 36", 236 or 336 asserts that the occupant is a belted child seat. If the ratio is intermediate, then the microprocessor of processing unit 36, 36", 236 or 336 may delay making a decision until additional readings are taken to more definitely ascertain the nature of the seat occupant before asserting either that the weight is equal to the tentative value or asserting that the occupant is a child seat.

Two methods are described herein for distinguishing between an adult seat occupant and a child seat held by seat belts under such tension that force sensor 30, 30" or 30'" reading could indicate an adult. The first method described in the preceding two paragraphs has the disadvantage that it cannot distinguish between an adult seat occupant and a child until the vehicle has undergone a vertical acceleration. This is a disadvantage because the car might strike an object immediately after starting out and the airbag could deploy before the nature of the seat occupant is determined. This concern cannot be ignored because there have been a number of airbag deployments at low speeds when vehicles have driven into obstacles in public parking places. Such a deployment can be hazardous to a child in a baby seat or a child seat. One response to this concern is to disable deployment of passenger side airbags until a vertical acceleration is encountered as the vehicle is driven. This solution leaves the airbag operable most of the time because a sufficient vertical acceleration is likely to occur soon after a trip begins. A solution that enables immediate airbag activation follows:

The second method requires a seat belt tension sensing switch equivalent to switch 252 illustrated in FIG. 7 or a force sensor responsive to seat belt tension. The switch is preferred because it costs less while meeting all reasonable requirements. The switch design has the possible disadvantage that it will assert the seat is occupied by a child seat if the seat belt tension switch is closed because an adult has tightened the seat belt to a predetermined threshold tension which might be twenty pounds. However, this disadvantage is believed to be of little consequence because it is unlikely that a person would tolerate a seat belt at such a high tension for an extended period of time. Also, including the accelerometer as described hereinabove in addition to the seat belt tension sensing switch enables both methods to be combined which further reduces the likelihood that an adult occupant with a tight seat belt would be confused with a child seat.

Continuing now the description of the operation of the seat occupant weight sensing systems 20, 20', 220 and 320 of the invention with particular reference to FIGS. 2, 6, 7, 8, 9 and 12; the conditions that might occur during operation are considered in the following to show how the weight sensing system in combination with a seat belt tension sensing switch correctly identifies each condition to enable correct operation of the airbag.

The following 14 cases summarize the possible normally seated (as distinct from out of position) human occupants of a vehicle seat. 1) An infant weighing up to 18 pounds in an infant seat anchored with a seat belt that is a) not under sufficient tension to close switch 252 b) is under sufficient tension to close switch 252. 2) A child weighing up to forty pounds in a forward facing child seat of the type that provides its own belt restraint that is anchored with a seat belt that is a) not under sufficient tension to close switch 252 b) is under sufficient tension to close switch 252. 3) A child weighing up to 60 pounds in a forward facing child seat of the type that uses the vehicle seat belts to restrain the child and the vehicle seat belts a) are not under sufficient tension to close switch 252 b) are under sufficient tension to close switch 252. 4) A child weighing less than 66 pounds seated normally in the vehicle seat and belted with belts that a) are not under sufficient tension to close switch 252 b) are under sufficient tension to close switch 252. 5) A child weighing over 66 pounds seated normally in the vehicle seat and belted with belts that a) are not under sufficient tension to close switch 252 b) are under sufficient tension to close switch 252. 6) An adult weighing under 110 pounds seated normally in the vehicle seat and belted with belts that a) are not under sufficient tension to close switch 252 b) are under sufficient tension to close switch 252. 7) An adult weighing over 110 pounds seated normally in the vehicle seat and belted with belts that a) are not under sufficient tension to close switch 252 b) are under sufficient tension to close switch 252. The operation of the seat occupant weight sensing systems 20, 20', 220 and 320 of the invention is described below for each of the aforementioned 14 cases. It is desired to assure with high confidence that the airbag will not deploy if the seat is occupied by an infant or child weighing less than 30 kilograms (66 pounds) and to assure with high confidence that the airbag will deploy if the seat is occupied by an adult weighing more than 50 kilograms (110 pounds). To make this distinction, airbag deployment is permitted if the occupant weight is estimated to be above 95 pounds. In each case the seat belt tension sensing switch 252 is assumed to close at a tension of 20 pounds. It will be obvious from the following to prepare similar analysis for a different deployment criteria.

Case 1- An Infant Weighing Less than 18 Pounds in an Infant Seat

If the seat belt tension is less than 20 pounds the occupant weight estimated by the seat occupant weight sensing systems 20, 20', 220 or 320 of the invention results from the weight of the infant in the seat plus force applied by the seat belt. If the tension in the seat belt is between 0 and 20 pounds belt tension sensing switch 252 is open and total force from the seat belt is between 0 and 40 pounds (twenty pounds doubled) applied at an angle of about thirty degrees from the vertical so it has a total downward component between 0 and 30 pounds. The total of the forces from the weight of the infant and its seat and the seat belt tension is interpreted by the weight sensing system to indicate an occupant weight between (hypothetically) 10 and 55 pounds. As described elsewhere herein, the occupant weight is obtained from a table or function obtained by analyzing many outputs of force sensor 30, 30" or 30'" for many seat occupants. The hypothetical range of 10 to 55 pounds is believed to be a likely range of measurements but the actual estimate of occupant weight for a particular vehicle and seat would be the result of applying the process of generating and then using a table or function as described at several places herein with reference in different instances to FIGS. 2, 6, 9 or 12. Because the weight estimate is less than 95 pounds processing unit 36, 36", 236 or 336 asserts that the seat is occupied by a person weighing less than 95 pounds and that the airbag should not be deployed.

If the seat belt tension is over 20 pounds the seat belt tension switch 252 is closed and seat processing unit 36, 36", 236 or 336 occupant weight sensing systems 20, 20', 220 or 320 respectively asserts that the seat is occupied by a child seat of unknown weight and that the airbag should not be deployed.

Case 2—A Child Weighing Less than 40 Pounds in a Child Seat

If the seat belt tension is less than 20 pounds the occupant weight estimated by the seat occupant weight sensing systems 20, 20', 220 or 320 of the invention results from the weight of the child in the seat plus force applied by the seat belt. If the tension in the seat belt is between 0 and 20 pounds belt tension sensing switch 252 is open and total force from the seat belt is between 0 and 40 pounds (twenty pounds doubled) applied at an angle of about thirty degrees from the vertical so it has a total downward component between 0 and 30 pounds. The total of the forces from the weight of the child and its seat and the seat belt tension is interpreted by the weight sensing system to indicate an occupant weight between (hypothetically) 20 and 80 pounds. As described elsewhere herein, the occupant weight is obtained from a table or function obtained by analyzing many outputs of force sensor 30, 30" or 30'" for many seat occupants. The hypothetical range of 20 to 80 pounds is believed to be a likely range of measurements but the actual estimate of occupant weight for a particular vehicle and seat would be the result of applying the process of generating and then using a table or function as described at several places herein with reference in different instances to FIGS. 2, 6, 9 or 12. Because the weight estimate is less than 95 pounds processing unit 36, 36", 236 or 336 asserts that the seat is occupied by a person weighing less than 95 pounds and that the airbag should not be deployed.

If the seat belt tension is over 20 pounds the seat belt tension switch 252 is closed and seat processing unit 36, 36", 236 or 336 occupant weight sensing systems 20, 20', 220 or 320 respectively asserts that the seat is occupied by a child seat of unknown weight and that the airbag should not be deployed.

Case 3—A Child Weighing up to 60 Pounds in a Forward Facing Child Seat

The type of seat that accommodates a 60 pound child raises the child slightly and uses the vehicle seat belts to restrain the child. It does not provide a separate restraint. Therefore the seat belt tension would be approximately zero because any substantial tension would make the child uncomfortable. Nevertheless, because the child is positioned forward of the normal seated position and the resulting torque is diminished the weight estimated by seat occupant weight sensing systems 20, 20', 220 or 320 is less than the actual weight if the seat belt tension is zero. For example, if the actual weight is 60 pounds the estimated weight might be 50 pounds when the set belt tension is zero.

If the seat belt tension is less than 20 pounds the occupant weight estimated by the seat occupant weight sensing systems 20, 20', 220 or 320 of the invention results from the weight of the child in the seat plus force applied by the seat belt. If the tension in the seat belt is between 0 and 20 pounds belt tension sensing switch 252 is open and total force from the seat belt is between0 and 40 pounds (twenty pounds doubled) applied at an angle of about thirty degrees from the vertical so it has a total downward component between0 and 30 pounds The total of the forces from the weight of the child and its seat and the seat belt tension is interpreted by the weight sensing system to indicate an occupant weight between (hypothetically) 50 and 90 pounds for a 60 pound child. As described elsewhere herein, the occupant weight is obtained from a table or function obtained by analyzing many outputs of force sensor 30, 30" or 30''' for many seat occupants. The hypothetical range of 50 to 90 pounds is believed to be a likely range of measurements but the actual estimate of occupant weight for a particular vehicle and seat would be the result of applying the process of generating and then using a table or function as described at several places herein with reference in different instances to FIGS. 2, 6, 9 or 12. Because the weight estimate is less than 95 pounds processing unit 36, 36", 236 or 336 asserts that the seat is occupied by a person weighing less than 95 pounds and that the airbag should not be deployed.

If the seat belt tension is over 20 pounds, which is believed to be a low or near zero probability condition, the seat belt tension switch 252 is closed and seat processing unit 36, 36", 236 or 336 of occupant weight sensing systems 20, 20', 220 or 320 respectively asserts that the seat is occupied by a child seat of unknown weight and that the airbag should not be deployed.

Case 4—A Child Weighing up to 66 Pounds Seated in the Vehicle Seat

A child weighing almost 66 pounds would install the belts by himself or herself. Therefore the seat belt tension would be near zero for two reasons: Firstly, it would be difficult for a 66 pound child to exert the force required to install the belt at a tension near 20 pounds. Secondly, any substantial tension would make the child uncomfortable. Accordingly, seat belt tension is assumed to be near zero.

The weight of the child is estimated by the weight sensing system to be approximately the actual weight of the child. The weight estimate is the result of applying the process of generating and then using a table or function as described at several places herein with reference in different instances to FIGS. 2, 6, 9 or 12. Because the weight estimate is less than 95 pounds processing unit 36, 36", 236 or 336 asserts that the seat is occupied by a person weighing less than 95 pounds and that the airbag should not be deployed.

Case 5—A Child Weighing More than 66 Pounds Seated in the Vehicle Seat

A child weighing this much would install the belts by himself or herself. Therefore the seat belt tension would be near zero for two reasons: Firstly, it would be difficult for a 66 pound child to exert the force required to install the belt at a tension near 20 pounds. Secondly, any substantial tension would make the child uncomfortable. Accordingly, seat belt tension is assumed to be near zero.

The weight of the child is estimated by the weight sensing system to be approximately the actual weight of the child. The weight estimate is the result of applying the process of generating and then using a table or function as described at several places herein with reference in different instances to FIGS. 2, 6, 9 or 12. The weight is sent to the SDM. If the weight estimate is less than 95 pounds processing unit 36, 36', 236 or 336 signals that airbag deployment should be suppressed. If the weight estimate is between 95 pounds and 110 pounds the SDM may limit the airbag inflator to low energy deployment because of the small mass of the seat occupant.

Case 6—An Adult Weighing Less than 110 Pounds Seated in the Vehicle Seat

The seat belt tension would be approximately zero because substantial tension would require strength and any substantial tension would make the adult uncomfortable.

The weight of the adult is estimated by the weight sensing system to be approximately the actual weight of the adult. The weight estimate is the result of applying the process of generating and then using a table or function as described at several places herein with reference in different instances to FIGS. 2, 6, 9 or 12. Airbag deployment or nondeployment are both acceptable for an adult in this range of weights. The weight is sent to the SDM. If the weight estimate is less than 95 pounds processing unit 36, 36", 236 or 336 of seat occupant weight sensing system 20, 20', 220 or 320 respectively signals that airbag deployment should be suppressed. If the weight estimate is between 95 pounds and 110 pounds the SDM may limit the airbag inflator to low energy deployment because of the small mass of the seat occupant.

Case 7—An Adult Weighing More than 110 Pounds Seated in the Vehicle Seat

The seat belt tension would be approximately zero because any substantial tension would make the adult uncomfortable. However, it may happen that a very large adult might stress the seat belt to a tension such as 20 pounds and not be bothered by the resulting pressure.

The weight of the adult is estimated by the weight sensing system to be approximately the actual weight of the adult. The weight estimate is the result of applying the process of generating and then using a table or function as described at several places herein with reference in different instances to FIGS. 2, 6, 9 or 12. Airbag deployment is required for an adult in this range of weights. The weight is transmitted to the SDM. If the weight estimate is near 110 pounds processing unit 36, 36", 236 or 336 may limit the airbag inflator to low energy deployment because of the small mass of the seat occupant.

The decision about deployment reached in the preceding 7 cases may be revisited as soon as the vehicle passes over a bump that causes sufficient vertical acceleration for the possibility of a tight seat belt to be tested as described hereinabove with reference to FIG. 8. If the process described hereinabove with reference to FIG. 8 indicates that the seat is occupied by a person whose weight warrants airbag deployment then seat belt tension indicating switch 252 being closed becomes just another factor to be considered. As described hereinabove with reference to FIG. 8, the change in the weight indicated by seat occupant weight sensing system 20, 20', 220 or 320 divided by the change in acceleration in g's is an indication of the weight of the seat occupant. The following two examples illustrate that both the vertical acceleration and seat belt tension sensing switch can be used together to arrive at an improved knowledge of the seat occupant.

EXAMPLE 1

Assume that seat belt tension sensing switch 252 is closed and the weight estimated by seat occupant weight sensing system 20, 20', 220 or 320 is 330 pounds. If the vehicle passes over a rise and the vertical accelerometer output goes from 1.0 g to 0.5 g while the weight estimated by seat occupant weight sensing system 20, 20', 220 or 320 changes from 330 pounds to 190 pounds the change in estimated weight divided by the change in vertical acceleration is 280 pounds which is an estimate of the occupant weight. Therefore, a reasonable conclusion is that the occupant weighs 280 to 300 pounds because at least 30 pounds is being provided by the seat belt leaving a first weight estimate of no more than 300 pounds and a second weight estimate of 280 pounds. The additional 40 pounds being estimated by weight sensing system 20, 20', 220 or 320 is interpreted to be a consequence of force applied by the seat belt and this conclusion is supported by the closure of seat belt tension sensing switch 252. On the other hand, if seat belt tension sensing switch were open in the aforementioned case a maximum of about thirty pounds of weight (twice the maximum belt tension that can occur without closing switch 252 times the cosine of 30 degrees) could be ascribed to the seat belt and a preferred estimate of the occupant weight would be the original estimate of 330 pounds and the lower estimate based of vertical acceleration would be assumed to result from other factors such as the occupant holding himself against the forces from the acceleration. In this case processing unit 36, 36", 236 or 336 may deploy the airbag inflator at a high energy as soon as possible because of the large mass of the seat occupant.

EXAMPLE 2

Assume that seat belt tension sensing switch 252 is not closed and the weight estimated by seat occupant weight sensing system 20, 20', 220 or 320 is 140 pounds. If the vehicle passes over a rise and the vertical accelerometer output goes from 1.0 g to 0.5 g while the weight estimated by seat occupant weight sensing system 20, 20', 220 or 320 changes from 140 pounds to 90 pounds the change in estimated weight divided by the change in vertical acceleration is 100 pounds which is an estimate of the occupant weight. Therefore, a possible conclusion without information from seat belt tension sensing switch 252 would be that the occupant weighed 100 pounds and 40 pounds of the estimated weight was the result of seat belt tension. However, if seat belt tension sensing switch 252 remained open that conclusion would be rejected and the conclusion would follow that the occupant did weigh 140 pounds and applied his or her hands to the roof of the car with a force of 40 pounds. Another scenario would be if the seat belt tension sensing switch 252 closed as the vehicle passed over the rise which would suggest that the seat belt was applying an increased force as the vehicle passed over the rise and the weight estimate of 140 pounds is the best available weight estimate.

Many examples like the preceding two will come to the reader's mind. The preceding two examples teach that vertical accelerations that increase the apparent force of gravity from such as driving through a dip are preferred for weight estimating because they do not cause or encourage the seat occupant to rise against seat belts or act to resist the actual force from the acceleration. The examples also suggest that a seat belt force sensing device able to measure seat belt tension would have many applications. A belt tension sensor would remove all doubt about whether or not the seat belt was contributing to the forces received by weight sensing system 20, 20', 220 or 320. The examples also illustrate that uncertainties may remain after one instance of vertical acceleration which suggests it may sometimes be necessary to combine several instances of vertical acceleration to confidently use it for determining the occupant's weight.

The preceding description of the invention with reference to FIGS. 7 and 8 and other figures demonstrates that an occupant weight sensing system able to identify all circumstances presently believed to need identification can be accomplished inexpensively with only one or two force sensors and a switch responsive to seat belt tension. It will be evident to those skilled in the relevant arts that seat belt tension sensing switch 252 can be replaced with a tension sensing load cell at greater expense and that this would provide improved estimates of the occupant weight. For example, in the cases discussed in the preceding three paragraphs if the seat belt tension were known then the vertical accelerometer would be a redundant source of information. For example, if the tension in the belt remained constant at 12 pounds then 24 pounds times the cosine of the angle of the belt from the vertical would be subtracted from the estimated weight to obtain a more accurate weight. In general, if the seat belt tension is known, twice the vertical component of the tension force is subtracted from the estimated seat occupant weight to improve the accuracy.

Proceeding now with particular reference to FIGS. 9, 10 and 11, seat occupant weight sensing system 220 comprises processing unit 236 connected with force sensor 30", seat back recline sensor 212 and seat track position sensor 222. Processing unit 236 is connected through cable 36' with force sensor 30", through cable 212' with seat back recline sensor 212 and through cable 222' with seat track position sensor 222. A seat belt tension sensing switch like switch 252 illustrated in FIGS. 6 and 7 could be included and connected to processing unit 236. Processing unit 236 includes a microprocessor and may include an accelerometer responsive to vertical acceleration and an atmospheric pressure sensor. Back 14' of seat 210 is rotated fifteen degrees counterclockwise around seat back recline sensor 212 from the position of seat back 14 of seat 10 illustrated in FIG. 2. Occupant 12 is illustrated in the position illustrated in FIG. 2 and occupant 12' is illustrated in a position appropriate for when the seat back 14' is reclined the additional fifteen degrees illustrated in FIG. 9. Seat 210 is different from seat 10 or 10' by incorporating seat occupant weight sensing system 220 in place of seat occupant weight sensing system 20 or 20'. Occupant weight sensing systems 20 and 20' are cushion based systems responsive to torque applied to platform 22 through seat cushion 16. Occupant weight sensing system 220 is a frame based system responsive to torque applied to the entire seat. Seat occupant weight sensing system 220 also comprises forward seat anchors 224, flanges 229 and rear seat anchors 230.

Processing unit 236 is preferably combined with an SDM into one package and, preferably, shares the microprocessor. If processing unit 236 and the SDM are not unitary then there is an electrical connection between processing unit 236 and the SDM for transmitting information therebetween.

Seat 210 is a conventional vehicle seat except that a rigid steel beam 244 has been added in place of two flanges for attaching seat 210 to the vehicle floor. Beam 244 extends horizontally between two rear seat frame members 214 to which it is attached by welds 216 and has three vertical holes: one for receiving neck 124" of force sensor 30" and two for engaging larger diameter segments 234 of studs 232. Each forward flange of seat 210 is bolted to the vehicle floor in the same way it would be attached if seat 210 did not sense occupant weight. Seat 210 is equipped with a seat track position sensor 222 and a seat back recline sensor 212.

Forward seat anchors 224 attach flanges 229 of seat 210 to the vehicle floor. Forward seat anchors 224 comprise nuts 238 engaging studs 232 welded to the vehicle floor. Forward seat anchors 224 operate as pivots by virtue of the flexibility of the vehicle floor. Forward seat anchors allow rotation of seat 210 about axis 224' which is approximated by a line between seat anchors 224. Other known attachment means may be substituted. An alternate attachment means which is presently in high volume production comprises a hook engaging a loop attached to the vehicle floor which would also allow the seat to rotate about axis 224'.

Rear seat anchors 230 each comprise a threaded stud 232 with a larger diameter segment 234, a head 235 and a nut 238 tightened against larger diameter segment 234. Head 235 is attached by welding to vehicle floor 226. (In many vehicles head 235 is welded to a structural beam and the beam is welded to the vehicle floor.) (Please refer to FIG. 10 for an illusion showing the relationship between threaded stud 232, larger diameter segment 234, head 235, nut 238, floor 226 and horizontal beam 244.) The bearing between horizontal beam 244 and larger diameter segment 234 is illustrated as a hole in horizontal beam 244 slidingly movable on larger diameter segment 234. For lower friction a low friction bearing such as a recirculating ball sleeve, may be substituted for the sliding bearing illustrated in FIGS. 10 and 11. Seat anchors 230 allow horizontal beam 244 limited vertical movement between a lower position where it contacts heads 235 and an upper position where it contacts nuts 238.

Force sensor 30" is preferably the same as force sensor 30" illustrated in FIG. 16 and fully described hereinafter. Force sensor 30" provides an electrical signal through electrical cable 36' to processing unit 236 indicating the axial force applied by beam 244 to force sensor 30". In the preferred design described hereinafter with reference to FIG. 16, force sensor 30" contains a liquid that is pressurized by the force applied by beam 244 and also contains a pressure sensor that provides an electrical output indicating the pressure in the liquid.

Force sensor 30" resides in well 228 formed in the vehicle floor 226 and is attached by nut 282 to horizontal beam 244. Force sensor 30" senses force resulting from the weight of the seat and the weight of its occupants. Because force sensor 30" is located a fixed distance from axis 224' the output of force sensor 30" indicates torque about axis 224' from the weight of seat 210 and its occupant.

Seat track position sensor 222 and seat back recline sensor 212 may be any of the known sensors conventionally installed on vehicle seats for sensing track position and seat back recline respectively.

Seat track position sensor 222 senses the forward-backward position of seat 210 on its track. Seat 210 moves forward and backward on its track over a range of positions that typically extends over about nine inches. The track and different positions of seat 210 on its track are not illustrated.

A table of data is entered into the memory of the microprocessor of processing unit 236 which the microprocessor uses to determine the occupant weight from the data provided by sensors 30", 212 and 222. The data in the table are based on the outputs of the sensors 30", 212 and 222 for many different persons and multiple track and recline positions for each person. A method for creating a table follows: For each table entry an adult or a child of known weight sits in seat 210 and the weight, the output of force sensor 30", the output of seat back recline sensor 212 and the output of track position sensor 222 are recorded. For each person the sensor outputs are recorded for many seat track positions and seat back recline angles. Enough data are taken to establish a relationship between the weight of the person in the seat and the outputs of sensors 30", 212 and 222.

The following example illustrates the creation of a table based on occupant weight, the seat track position provided by seat track position sensor 222, seat back recline angle provided by recline sensor 212 and torque provided by force sensor 30": For a forward track position with a 60 pound child at first, second and third seat back recline angles force readings of 42 pounds, 47 pounds and 57 pounds are entered, for an intermediate seat track position force readings of 46 pounds, 52 pounds and 63 pounds are entered for the three aforementioned seat back recline angles and for a rear seat track position force readings of 50 pounds, 57 pounds and 69 pounds are entered for the three aforementioned seat back recline angles. (Note that in the examples force readings resulting from the weight of the seat are subtracted so the above forces represent only forces resulting from the weight of the person. Also note that because of the leverage of the seat back, force readings sometimes exceed the weight of the person in the seat.) With a 120 pound adult in the seat and the seat at the aforementioned forward track position force readings of 74, 84 and 98 pounds are entered for the aforementioned first, second and third seat back recline angles; for the aforementioned intermediate seat track position force readings of 82, 94 and 110 pounds are entered for the aforementioned three seat back recline angles and for the aforementioned rear seat track position force readings of 94, 108 and 126 pounds are entered for the aforementioned three seat back recline angles. With a different 120 pound person in the seat and the seat at the aforementioned intermediate seat track position readings of 85, 102 and 122 pounds are entered for the seat back in the aforementioned first, second and third seat back recline angles. Such different readings could result if the second 120 pound occupant has more weight concentrated in the chest than the first 120 pound occupant. The process is repeated for many people to create a table covering the expected range of occupant weights.

To minimize the burden on the microprocessor, a mean value based on all tested persons of the same weight and at the same seat recline angle and track position are entered into the memory of the microprocessor instead of making a separate entry for each recline angle and seat track position for each person of a given weight. Accordingly, in the exemplary table described in the preceding two paragraphs based on two different 120 pound seat occupants, the table entries for the aforementioned intermediate seat track position for a 120 pound occupant would contain 83.5, 98 and 116 pounds (averages of 85 and 82; 102 and 94; and 122 and 110 pounds respectively) for the first, second and third seat back recline angles.

Instead of a table, a function of force sensed by force sensor 30" and seat back recline angle may be used to estimate the weight of a seat occupant. For example, in the following expression X represents the output of force sensor 30" in pounds and Y represents the estimated occupant weight.

$$Y \text{ (occupant weight)} = A*(1-\exp(-(X/C)^2))+B*X$$

If the parameters are set to A=−26 pounds, B=1.482 and C=1.935 pounds the expression evaluates to 0 pounds at X=0; 60 pounds at x=52 pounds and 120 pounds at x=98 pounds. This demonstrates a function that enables replacing the part of the table lookup based on the force sensor output with evaluation of a function having parameters adapted for the aforementioned intermediate seat track position and second seat back recline value. For each seat track position and seat back recline angle a function like the above but having different parameters enables replacing part of the table lookup with evaluation of a function. Many other ways of fitting data with parameterized functions will be evident to those skilled in the art of designing parameterized functions to fit experimental data.

The materials referred to hereinabove are only suggestions and other materials may be selected by those skilled in the relevant arts.

The operation of the seat occupant weight sensing system 220 of the invention will now be described with reference to FIGS. 9, 10 and 11.

When a person sits in seat 210 force from the weight of seat 210 and the weight of the person is received from seat frame members 214 by horizontal beam 244. Horizontal beam 244 receives downward force from seat frame members 214 and transmits that force to force sensor 30". Horizontal beam 244 applies that force to shoulder 122" of force sensor 30" thereby increasing the pressure in the liquid 198 in force sensor 30". Pressure sensor 130 transmits a signal indicating the pressure in liquid 198 through cable 36' to processing unit 236. For a more detailed description of the operation of force sensor 30" the reader is referred to the complete description provided hereinafter with reference to FIG. 16. The microprocessor in processing unit 236 multiplies the force signal from force sensor 30" by the distance from force sensor 30" to axis 224' to calculate the torque being applied to seat 210 about axis 224'.

Force sensor 30" senses force resulting from the weight of the seat and the weight of its occupants. Because force sensor 30" is located a fixed distance from axis 2241 and responds to force that is perpendicular to axis 224' and is also perpendicular to a vector from axis 224' to force sensor 30' the output of force sensor 30" indicates the torque about axis 224' caused by the weight of seat 210 and the forces applied to seat 210 resulting from the weight of the occupant of seat 210.

Rear seat anchors 230 allow limited vertical movement of horizontal beam 244 between heads 235 and nuts 238 while larger diameter segments 234 prevent horizontal movement. Downward movement of horizontal beam 244 into abutment with heads 235 could happen if a large torque from such as the vehicle being struck from the rear caused sufficient downward force to bend horizontal beam 244. When beam 244 moves vertically seat 210 rotates about axis 224'.

Torque on seat 210 from such as a rough road, braking or a collision may cause horizontal beam 244 to move upward until it abuts nuts 238.

The following example illustrates the use of hypothetical data provided by sensors 30", 212 and 222 in combination with the exemplary table stored in the microprocessor of processing unit 236 described hereinabove to obtain the weight of the seat occupant.

Assume processing unit 236 receives a reading from seat track position sensor 222 that seat 210 is at its second track position, a reading from seat back recline sensor 212 that seat back 14' is at the second seat back recline angle while receiving a force reading from force sensor 30" of 100 pounds. Processing unit 236 finds the table entry closest to 100 pounds among those table entries for which seat 210 is at its second track position and seat back 14' is at the second recline angle which is 98 pounds. The code in the microprocessor of processing unit 236 assumes the weight is proportional to the reading from force sensor 30" for data values near a table entry. Therefore, the weight of the occupant is estimated by multiplying the weight entered in the table by the ratio 100/98 to get 122 pounds.

The following second example illustrates using a parameterized expression adapted for a specific seat track position and seat back recline angle instead of performing a table lookup based upon the reading from force sensor 30". In the aforementioned expressing reproduced below X represents the output of force sensor 30" in pounds and Y represents the estimated occupant weight.

$$Y \text{ (occupant weight)} = A*(1-\exp(-(X/C)^2))+B*X$$

If the parameters are set to A=−26 pounds, B=1.482 and C=1.935 pounds the expression evaluates to Y=123 pounds for X=100 pounds which is close to the value of 122 pounds obtained by using a table lookup algorithm.

It may happen that for certain seats and large seat back recline angles processing unit 236 cannot determine the weight of the seat occupant. In that case the microprocessor of processing unit 236 registers that it cannot ascertain the weight of the occupant of seat 210. This is believed to be acceptable because instances of occupants of seats having very reclined backs are believed to require different handling by the SDM. More particularly, the cases of greatest concern are babies in infant seats and small people situated close to the stored airbag. Neither of these cases is likely to be associated with a greatly reclined seat back.

If a vertical accelerometer and a seat belt tension sensing switch like switch 252 illustrated in FIGS. 6 and 7 are included then seat occupant weight sensing system 220 operates in the manner described hereinabove with reference to FIGS. 7 and 8 and other Figures to identify all circumstances related to a seat occupant believed to need identification for correct deployment of an airbag.

Proceeding now with particular reference to FIGS. 12 through 14, seat occupant weight sensing system 320 comprises processing unit 336 connected with two load cells 350, seat back recline sensor 212 and seat track position sensor 222. Processing unit 336 is connected through cables 36' with load cells 350, through cable 212' with seat back recline sensor 212 and through cable 222' with seat track position sensor 222. Processing unit 336 includes a microprocessor and may include an accelerometer responsive to vertical acceleration and an atmospheric pressure sensor. A seat belt tension sensing switch like switch 252 illustrated in FIGS. 6 and 7 may be included and connected to processing unit 336. Processing unit 336 is preferably combined with an SDM into one package and, preferably, shares the SDM's microprocessor. If processing unit 336 and the SDM are not unitary then an electrical connection (not illustrated) is provided between processing unit 336 and the SDM for transmitting information therebetween.

Seat 310 is a conventional vehicle seat equipped with a seat track position sensor 222 and a seat back recline angle sensor 212. Seat 310 is attached to the vehicle by forward seat anchors 224 at two flanges 229 and by the two load cells 350 at two flanges 346 and 348.

Back 14' of seat 310 is rotated fifteen degrees counter-clockwise around seat back recline sensor 212 from the position of seat back 14 of seat 10 illustrated in FIG. 2. Occupant 12 is illustrated in the position illustrated in FIG.

2 and occupant 12' is illustrated in an appropriate position for the reclined orientation of seat back 14' illustrated in FIG. 12. Seat 310 is a conventional vehicle seat in all respects and may be the same as seat 210 illustrated in FIG. 9 except that beam 244 is not included and seat 310 includes two flanges 346 and 348.

Forward seat anchors 224 are conventional anchors attaching flanges 229 to the floor of the vehicle. Forward seat anchors 224 comprise nuts 238 engaging studs 232 welded to the vehicle floor. Forward seat anchors 224 operate as pivots by virtue of the flexibility of flanges 229 and the vehicle floor. Forward seat anchors allow rotation of seat 310 about axis 224' which is approximated by a line between seat anchors 224. Other known attachment means may be substituted. An alternate forward seat anchor which is presently in high volume production replaces flanges 229 with one or two hooks engaging loops attached to the vehicle floor.

Load cells 350 each comprise a force sensor 30''' a lower housing 352, a retaining clamp 362, a force transmitter 372 and a Belleville spring 360.

Force sensor 30''' comprises bottle 380 filled with liquid 198, pressure sensor 330, electrically insulating feedthrough 134'', electrical conductors 136, electrical cable 36' and clamping ring 127''. Force sensor 30''' is preferably the same as force sensor 30'' illustrated in FIG. 16 and fully described hereinafter except that its bottle 380 has a shorter neck and the neck is not threaded. Pressure sensor 330, electrically insulating feedthrough 134'', electrical conductors 136, electrical cable 36' and clamping ring 127'' are identified by the same numbers and may be the same as the corresponding components of force sensor 30'' illustrated in FIG. 16 which are fully described hereinafter. Bottle 380 comprises base 382, bellows shaped sides 384, shoulder 386 and neck 388. Pressure sensor 330 of force sensor 30''' provides an electrical signal through conductors 136 and cable 36' to processing unit 336. Liquid 198 is pressurized by the force applied by flange 376 of force transmitter 372 to a pressure approximately equal to the force applied by flange 376 of force transmitter 372 to force sensor 30''' divided by the area of the base 382 of bottle 380. The electrical signals from pressure sensors 330 therefore indicate the force applied to load cells 350.

Lower housing 352 is a cup shaped element comprising a flat base 354, cylindrical threaded sides 356 and a flange 358. Lower housing 352 is preferably made of a steel selected for optimum strength at minimum cost. For compatibility, a preferred choice is the steel used for threaded fasteners 328. Threaded sides 356 engage the threads of threaded fasteners 328 for retaining load cells 350 during large upward forces which might result from a collision of the vehicle. Threaded fasteners 328 are unitary with the floor 326 of the vehicle. In a typical current production design fasteners like threaded fasteners 328 are welded to the inside of a "U" shaped beam which is then turned upside down and welded to the vehicle floor. FIG. 14 illustrates two threaded fasteners 328 each engaging a load cell 350.

Retaining clamp 362 comprises upper flange 364, lower flange 366 and a cylindrical wall having an inside diameter 368. Retaining clamp 362 is preferably made of steel selected for minimum cost and sufficient formability to allow forming lower flange 366 by a process such as swaging after all parts of load cell 350 are assembled Lower flange 366 engages flange 358 of lower housing 352. An alternate method of assembly (not illustrated) that does not require swaging is to form mating spiral threads on inside diameter 368 of retaining clamp 362 and the outside diameter of flange 358 of lower housing 352. Upper flange 364 in combination with inside diameter 368 and flange 358 of lower housing 352 retain and locate the outside diameter of Belleville spring 360.

Force transmitter 372 comprises ledge 374, outside diameter 375, flange 376 and threaded neck 378. Outside diameter 375 in combination with flange 376 retain and locate the inside diameter of Belleville spring 360. Force transmitter 372 receives force from seat flange 346 or 348 at its ledge 374 and also receives force from Belleville spring 360 at its shoulder 376 and applies that force to the shoulder 386 of bottle 380. Force transmitter 372 has threaded neck 378 for engaging a nut 392 for attaching load cell 350 to a seat flange 346 or 348. Force transmitter 372 is preferably formed by drawing from steel sheet on a progressive die machine after which the threads are formed.

Belleville spring 360 is preferably made of steel and deflected an amount such that its force is approximately constant over an expected range of deflections. Having a constant force over a range of deflections makes the force it applies approximately independent of movement of force transmitter 372. Movement of force transmitter 372 might happen when force applied to load cell 350 causes the height of shoulder 386 of bottle 380 to diminish or during temperature change if the coefficient of thermal expansion of the liquid 198 is different from that of bottle 380 whereby temperature changes change the resting height of shoulder 386 of bottle 380 when there is no change in the force applied to load cell 350.

Nuts 392 each engage a threaded neck 378 of a force transmitter 372 of a load cell 350 for attaching seat flange 346 or 348 to a load cell 350. FIG. 13 shows a load cell 350 enlarged for clear illustration of its details with one of the seat flanges (346) and a nut 392.

Seat back recline sensor 212 and track position sensor 222 may respectively be any of the known sensors conventionally installed on vehicle seats or known to be suitable by those skilled in the relevant arts for sensing the position of a seat on its track and sensing seat back recline angle. While reclining, seat back 14' rotates about an axis indicated by the center of the circle indicating seat back recline sensor 212.

Seat track position 'sensor 222 senses the forward-backward position of seat 210 on its track. Seat 210 moves forward and backward on its track over a range of positions that extends over, typically, about twenty five centimeters. Different positions of the seat on its track are not illustrated.

A table is entered into the memory of the microprocessor of processing unit 336 containing data from which the microprocessor can determine the weight of the occupant from the outputs of the sensors 30''', 212 and 222 of occupant weight sensing system 320. The process of preparing a table for use in processing unit 336 is the same as the process described hereinabove with reference to FIGS. 9, 10 and 11 for preparing a table for use in processing unit 236 except that the force indications of the two load cells 350 are added together and the sum of the measurements is treated the same as the output of the single force sensor 30'' illustrated in FIGS. 9, 10 and 11. The reader is referred to the description of the seat occupant weight sensing system of the invention hereinabove made with reference to FIGS. 9, 10 and 11 for a detailed description of the process of preparing the table.

The materials referred to hereinabove are only suggestions and other materials may be selected by those skilled in the relevant arts.

The operation of the seat occupant weight sensing system 320 will now be described with particular reference to FIGS. 12, 13 and 14.

When seat 310 is empty force from the weight of seat 310 is received through seat frame members 342 and 344 at the flanges 346 and 348. Each flange transmits the force it receives to the ledge 374 of a force transmitter 372 which transmits the force to the shoulder 386 of a force sensor 30′″. Simultaneously a Belleville spring 360 is applying force to a shoulder 376 of each force transmitter 372 and each force transmitter 372 is also transmitting that force to the shoulder 386 a force sensor 30′″. These two forces add at each force sensor 30′″ and the sum is the total force applied to each force sensor 30′″. The total force at each force sensor 30′″ causes a pressure in each liquid 198 which is sensed by the pressure sensor 330 of each load cell 350. The outputs of the two force sensors 30′″, seat back recline sensor 212 and seat track position sensor 222 are sent to processing unit 336. The microprocessor of processing unit 336 may adjust the pressure indication received from each pressure sensor 330 for the actual atmospheric pressure and may also adjust the pressure indication for the actual ambient temperature. Processing unit 336 adds the pressures indicated by the signals received through cables 36′ and multiplies the sum by a factor that is approximately the area of the base 382 of bottle 380 to convert the sum of the two pressures to a total downward force being received by force sensors 30′″of load cells 350. Alternately, the microprocessor in processing unit 336 adds the two pressures indicated by the signals received from the two force sensors 30′″ and multiplies the sum by an alternate factor that is approximately the area of the base 382 of bottle 380 times the distance from a load cell 350 to axis 224′ to convert the sum of the two pressures to a total torque about axis 224′ resulting from the total force being applied to load cells 350. Finally, the microprocessor of processing unit 336 looks up the entry in the aforementioned table corresponding to the force or torque reading, seat track position reading and seat back recline angle using the process described hereinabove with reference to FIGS. 9, 10 and 11 and determines that the weight of the seat occupant is zero.

When a person sits in seat 310 force from the weight of seat 310 and the person is received through seat frame members 342 and 344 at the flanges 346 and 348. Each flange transmits the force it receives to the ledge 374 of a force transmitter 372 which transmits the force to the shoulder 386 of a force sensor 30′″. When this happens the distance from the base 382 of bottle 380 to shoulder 386 decreases slightly because of the very slight compression of liquid 198 and because the bellows shaped sides 384 stretch slightly in the radial direction which increases the volume of bottle 380. Belleville spring 360 continues to apply the same force to shoulder 376 of force transmitter because it is a constant force spring providing a force that is independent of the amount it is deflected. The forces on the shoulders 386 of force sensors 30′″ pressurizes liquids 198 in the two bottles to greater pressures than when the seat was empty. Each pressure sensor 330 inside each force sensor 30′″ sends a signal indicating the pressure in its liquid 198 to processing unit 336. The microprocessor of processing unit 336 may adjust the pressure indication received from each pressure sensor 330 for the actual atmospheric pressure and may also adjust the pressure indication for the actual ambient temperature. Processing unit 336 adds the pressures indicated by the signals received through cables 36′ together and multiplies the sum by a factor that is approximately the area of the base 382 of bottle 380 to convert the sum of the two pressures to a total downward force being applied by flanges 346 and 348 to load cells 350. Alternately, the microprocessor in processing unit 336 adds the two pressures indicated by the signals received from the two force sensors 30′″ through cables 36′ and multiplies the sum by an alternate factor that is approximately the area of the base 382 of bottle 380 times the distance from a load cell 350 to axis 224′ to convert the sum of the two pressures to a total torque being applied by flanges 346 and 348 to load cells 350 about axis 224′. Finally, the microprocessor of processing unit 336 looks up in its memory the entry in the aforementioned table corresponding to the force or torque, seat track position from seat track position sensor 222 and seat back recline angle from seat back recline sensor 212 and obtains an estimate of the weight of the person who is sitting in seat 310 by using the process described hereinabove with reference to FIGS. 9, 10 and 11. For a more detailed description of the operation of force sensor 30′″ the reader is referred to the complete description of the operation of force sensor 30″ presented hereinafter with reference to FIG. 16. The operation of force sensors 30″ and 30′″ are the same because the operation is not affected by the different shapes of the bottle necks.

Load cells 350 allow limited vertical movement of seat flanges 346 and 348 while preventing horizontal movement. Belleville spring 360 urges force transmitter 372 downward thereby causing a pressure at pressure sensor 330 when there is no weight on force sensor 30′″. A force or a torque applied to seat 310 might cause an upward force at flanges 346 that opposes the force of Belleville springs 360 and reduces the pressure at pressure sensor 330 whereby load cells 350 are responsive both to compressive and tensile forces. A large upward force or a torsion applied to seat 310 may completely overcome the force of Belleville spring 360 and cause seat frame members 342 and 344 to move upward. If this happens the upward movement of seat flange 346 or 348 is limited to the movement that causes Belleville spring 360 to abut the underside of flange 364 of retaining clamp 362. Further upward movement is prevented because flange 376 of force transmitter 372 abuts Belleville spring 360 which abuts upper flange 364 of retaining clamp 362 thereby providing a solid obstacle to further upward movement. Relative horizontal movement between flange 376 and lower housing 352 is prevented by the rigidity of Belleville spring 360 and the close fit between lower housing 352 and retaining clamp 362.

Angular misalignment between the axis of lower housing 352 and the axis of force transmitter 372 is accommodated by Belleville spring 360 and bottle 380. Angular misalignments result because of manufacturing variations in the vehicle and the seat. Belleville spring 360 accommodates misalignment by twisting about an axis in the direction around its circumference so that a first part of Belleville spring 360 (not illustrated) is dished more than a second part 180 degrees around Belleville spring 360 from the first part. Bottle 380 accommodates angular misalignment by compressing bellows shaped sides 384 more on one side than on the opposite side of bottle 380. It is believed that twisting Belleville spring 360 because of misalignment has little effect on the force it applies to force transmitter 372 if Belleville spring 360 is compressed to have approximately zero dish. Approximately zero dish results if Belleville spring 360 has a dish to thickness ratio of approximately 1.4 and is compressed to be a constant force spring. Therefore, load cell 350 satisfies the need for a load cell which is responsive to axial force but which is unresponsive to lateral force and is minimally affected by angular misalignment.

Load cell 350 indicates force resulting from the weight of seat 310 and the weight of its occupant. Because load cell 350 is located a fixed distance from axis 224′ and responds to force that is perpendicular to axis 224′ and is also perpendicular to a vector from axis 224' to load cell 350 the torque about axis 224' is obtained by multiplying the output of load cell 350 by the length of the vector from axis 224' to a load cell 350.

The weight of the occupant of seat 310 is determined from the sum of the forces measured by load cells 350 and the outputs of seat back recline sensor 212 and seat track position sensor 222 by the methods described hereinabove for obtaining the weight of the occupant of seat 210 from the force measured by force sensor 30" and the outputs of seat back recline sensor 212 and seat track position sensor 222. The reader is referred to the description of the operation of the invention presented hereinabove with reference to FIGS. 9, 10 and 11 for a detailed description of methods for determining the weight of a seat occupant from the measurements of force sensor 30", seat back recline sensor 212 and seat track position sensor 222.

If a vertical accelerometer and a seat belt tension sensing switch like switch 252 illustrated in FIGS. 6 and 7 are included then seat occupant weight sensing system 320 operates in the manner described hereinabove with reference to FIGS. 7 and 8 and other Figures to identify all circumstances related to a seat occupant believed to need identification for correct deployment of an airbag.

Proceeding now with particular reference to FIG. 15, force sensor 30 of seat occupant weight sensing system 20 is shown in a particular embodiment comprising electrical cable 36', an electrically insulating feedthrough 134 joined to electrical cable 36' at its outside end and to pressure sensor 130 at its inner end, a hydraulic cylinder 120, a piston 140, an "O" ring 146, a cover 150 and liquid 198.

Hydraulic cylinder 120 is preferably made of steel for low cost and ease of machining. Other materials including aluminum and brass are also suitable and offer the advantage of corrosion resistance. Hydraulic cylinder 120 comprises shoulder 122 and neck 124 threaded for mounting by such as nut 282 illustrated in FIG. 10. Hydraulic cylinder 120 also comprises central channel 125 which mates sealingly to the outside diameter of feedthrough 134. Hydraulic cylinder 120 also comprises wall 126 and outer flange 128. Wall 126 guides piston 140 and has a smooth surface against which "O" ring 146 seals to prevent loss of liquid 198. Outer flange 128 provides a latch for retaining cover 150.

Feedthrough 134 is preferably molded of a thermoplastic molding compound with electrical conductors 136 inserted before molding. Feedthrough 134 insulates electrical conductors 136 from electrical contact with each other and the surface of channel 125 of neck 124. Feedthrough 134 also seals against leakage of liquid 198 from the interior of force sensor 30. Cable 36' with clamping ring 132 is preferably molded into feedthrough 134. Clamping ring 132 is a ring preferably of a metal such as steel crimped around cable 36'. The plastic of feedthrough 134 engages clamping ring 132 thereby fixing cable 36' in feedthrough 134 and resisting pullout. To manufacture feedthrough 134, cable 36' with clamping ring 132 is placed in the mold with electrical conductors 136 extending across the cavity of the mold. Thermoplastic molding compound is then injected into the cavity to form feedthrough 134 and cable 36' as a unitary assembly. The plastic molding compound may be any composition known to provide a tight seal against leakage of liquid 198. The coefficient of thermal expansion of feedthrough 134 is preferable matched with the thermal expansion coefficient of hydraulic cylinder 120 to reduces thermal stresses. A preferred molding compound for feedthrough 134 is Ryton R9-02 available from Philips Engineered Plastics of Bartlesville, Okla.

Pressure sensor 130 is preferably a micromachined silicone solid state pressure sensor for sensing the pressure of liquid 198. Pressure sensor 130 is mounted on feedthrough 134 by a resilient adhesive to minimize mechanical strain that might affect the performance of pressure sensor 130. Pads (not illustrated) on pressure sensor 130 are electrically connected to the ends of electrical conductors 136 by fine aluminum or gold wires 136'.

Electrically insulating feedthrough 134 is installed in central channel 125 by a method that insures that liquid 198 will not flow past feedthrough 134. A preferred method for sealing between feedthrough 134 and central channel 125 comprises the following steps: Feedthrough 134 and central channel 125 are made with slight matching tapers to make insertion easier. Threaded neck 124 is heated in a high frequency induction heater or by blowing hot gas through channel 125 (or by any other method known to be suitable by those skilled in the art of controlled heating) to a temperature above the melting temperature of the molding compound of which insulating feedthrough 134 is made. Feedthrough 134 is inserted in central channel 125 of neck 124 and the parts are held stationary while the assembly cools. Initially, neck 124 melts the plastic at the surface of feedthrough 134 while being cooled by feedthrough 134 until its temperature is below the melting temperature of the plastic molding compound of which feedthrough 134 is made. As it cools, neck 124 contracts around feedthrough 134 while feedthrough 134 contracts less because it was only heated at its surface. After rehardening in conformance with the surface of channel 125 the molding compound at the surface between channel 125 and feed-through 134 operate in concert with the pressure from the contraction of neck 124 from its aforementioned heated state to make a tight seal. In an experiment the aforementioned process sealed 304 stainless steel 0.6 mm thick to Ryton R9-02.

Piston 140 is preferably made of the same material as hydraulic cylinder 120 and includes outer diameter 142 with groove 144 sized and polished to assure a good seal against "O" ring 146. The need for "O" ring 146 may be eliminated by providing a sufficiently high viscosity liquid or gel 198 and a sufficiently small clearance between piston 140 and surface 126 that liquid 198 does not leak through the clearance. Piston 140 also includes spherical protrusion 148 for receiving force resulting from the weight of the seat occupant.

Cover 150 shields against dirt intrusion and prevents piston 140 from separating from hydraulic cylinder 120 when force transmitter 30 is not installed in a vehicle. Cover 150 comprises spherical protrusion 158 and extension 152 having inward turning flange 154. Cover 150 is preferably formed from mild steel sheet. Cover 150 is joined to the rest of force sensor 30 by applying force to cover 150 thereby causing flange 154 to snap over flange 128 of hydraulic cylinder 120 whereupon the two parts latch together. Spherical protrusion 158 mates with spherical protrusion 148 of piston 140. When force is applied to force sensor 30, spherical protrusion 158 transfers that force to protrusion 148 of piston 140.

Liquid 198 may be any of the liquids known to be compatible with the material of which hydraulic cylinder 120 and piston 140 are made and also with the plastic molding compound of which electrically insulating feedthrough 134 is made and also with micromachined pressure sensor 130. Dow Corning of Midland, Mich. makes silicon based liquids of different viscosities designated DC200 fluids which are compatible with the preferred materials suggested hereinabove for the components of force sensor 30.

The materials referred to hereinabove are only suggestions and other materials may be selected by those skilled in the relevant arts.

The operation of force sensor 30 of the invention will now be described with particular reference to FIG. 15. When force is applied to spherical protrusion 158 the force is directly transmitted to spherical protrusion 148 of piston 140. Simultaneously, equal and opposite force is applied to shoulder 122 surrounding threaded neck 124. The liquid 198 inside hydraulic cylinder 120 is confined by the seal at "O" ring 146. Consequently, the liquid 198 inside hydraulic cylinder 120 is pressurized to a pressure equal to the applied force divided by the area defined by wall 126 of hydraulic cylinder 120. Pressure sensor 130 generates an electric signal indicating the pressure in liquid 198 and transmits that signal through conductors 136' and 136 to a processing unit such as processing unit 36 illustrated in FIG. 2.

Figure 16:
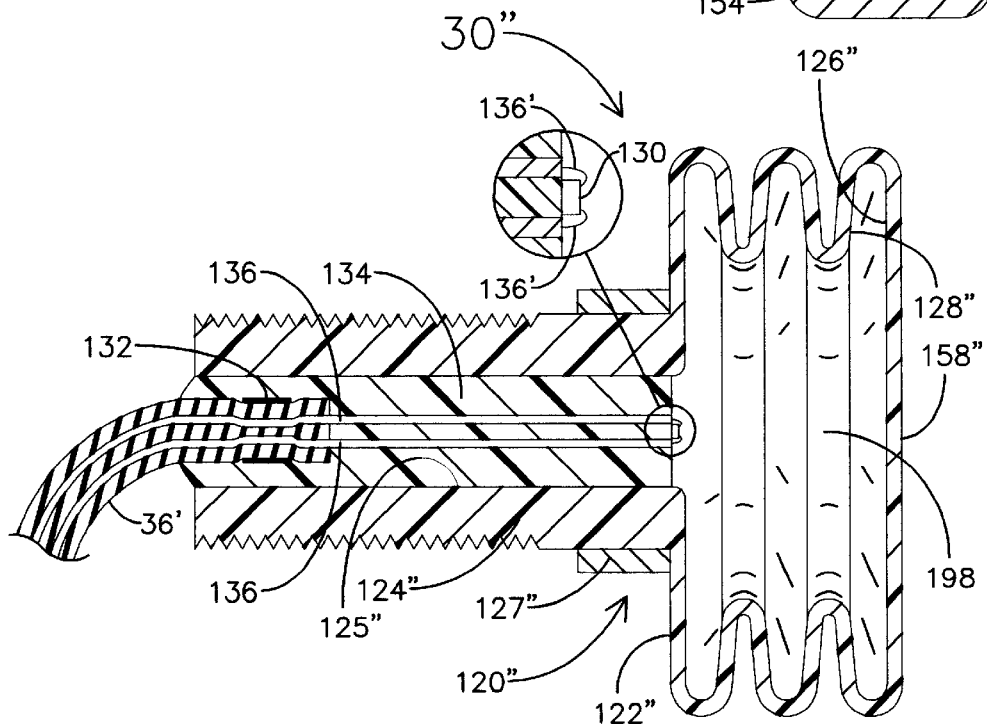
FIG. 16 shows an alternate force sensor wherein force is converted to hydraulic pressure and hydraulic pressure to an electric signal for measuring force or torque in the occupant weight sensing system of the invention.

Proceeding now with particular reference to FIG. 16, force sensor 30" is shown in a particular embodiment comprising electrical cable 36', a blow molded bottle 120" with bellows shaped sides 128" and an electrically insulating feedthrough 134 joined to electrical cable 36' at its outside end and to pressure sensor 130 at its inside end. Certain parts of force sensor 30" may be the same as the corresponding parts of force sensor 30 and are illustrated and numbered the same. Those parts that are different are numbered with numbers ending in double apostrophes. In particular, pressure sensor 130 and liquid 198 are preferably the same as described hereinabove with reference to FIG. 15 and feedthrough 134 may be the same or may be molded of a different compound for compatibility with bottle 120".

Blow molded bottle 120" is preferably made by stretch blow molding an injection molded preform. Polyethylene napthalate polyester in a formulation suitable for pressurized beverage bottles is believed to result in a superior bottle by virtue of its ability to resist deformation at temperatures as high as 105° C. Blow molded bottle 120" comprises shoulder 122", neck 124", central channel 125", flat surface 126", clamping ring 127", bellows shaped sides 128" and base 158". Neck 124" has rings or threads for engaging nut 282 illustrated in FIG. 10. Central channel 125" mates sealingly to the outside diameter of feedthrough 134. Clamping ring 127" applies compressive force to insure a good seal during the life of the system. The bellows shape of sides 128" enables sides 128" to compress by flexing when force is applied to force sensor 30" between shoulder 122" and base 158".

Clamping ring 127" is preferably a metal ring pressed onto a slightly tapered and unthreaded part of neck 124" for an interference fit. Other materials for clamping ring 127" and methods for installing clamping ring 127" may be selected by those skilled in the relevant arts.

Feedthrough 134 is installed in central channel 125" of neck 124" by a method that insures that liquid 198 will not flow past feedthrough 134. Maintaining close tolerances and applying clamping ring 127" is preferred for its low cost. Another preferred method of installing feedthrough 134 which is not illustrated is to make feedthrough 134 in the shape of a soda bottle lid with threads and a seal and making mating threads on neck 124" of bottle 120" using the highly developed technology for making beverage bottles and their lids and seals.

The materials referred to hereinabove are only suggestions and other materials may be selected by those skilled in the relevant arts.

The operation of force sensor 30" of the invention will now be described with particular reference to FIG. 16. When force is applied to shoulder 122" of blow molded bottle 120" the liquid 198 inside blow molded bottle 120" is confined by the bellows like structure of blow molded bottle 120" but blow molded bottle 120" compresses axially with little resistance when force is applied so the preponderance of the applied force is resisted by the pressure of liquid 198. Consequently, the liquid 198 inside blow molded bottle 120" is pressurized to a pressure approximately equal to the applied force divided by the area of flat surface 126" of the base 158" of blow molded bottle 120". Pressure sensor 130" produces a signal indicating the pressure in liquid 198 and transmits that signal through electrical conductors 136 and 136' to a processing unit such as processing unit 236 illustrated in FIG. 9.

Although the description of this invention has been given with w reference to particular embodiments, it is not to be construed in a limiting sense. Many variations and modifications will now occur to those skilled in the art. For a definition of the invention reference is made to the appended claims.

What is claimed is:

1. A seat occupant weight sensing system for an occupant protection system of a vehicle, said occupant. protection system comprising a processor and occupant protection means controlled by said processor for protecting an occupant, said seat occupant weight sensing system comprising:

a vehicle seat, said seat comprising a seat cushion, an element rotatable about an axis, said axis being located near a forward part of said seat, means responsive to torque about said applied to said seat cushion by applying said torque about said axis to said rotatable element, and torque sensing means connected with said rotatable element for providing a torque signal indicating torque applied to said rotatable element, and wherein said processor is connected with said torque sensing means for receiving said torque signal and considering said torque when controlling said occupant protection means; whereby the preponderance of torque, about said axis applied to said seat cushion is applied to said rotatable element and a torque sensor responsive to torque applied to sad rotatable element provides a signal indicating the weight of the seat occupant.

2. The invention as defined by claim 1 wherein:

said means for providing a torque signal comprises a force sensor connected wit said rotatable element at a distance from said axis for receiving force from said rotatable element, and said force sensor provides a force signal indicating said force received from said rotatable element, whereby said force signal is said torque signal.

3. The invention as defined by claim 1 wherein:

said means for providing a torque signal comprises a force sensor connected with sad rotatable element at a distance from said axis for receiving force from said rotatable element, said force sensor comprises: liquid, means for convert said force from said rotatable element to pressure in said liquid, and pressure sensing means for providing a pressure signal indicating said pressure, whereby said pressure signal is said torque signal.

4. The invention as defined by claim 3 wherein:

said means for converting said force to pressure in said liquid comprises a bottle having a shoulder, a base and sides joining said shoulder to said base, wherein said sides being sufficiently compressible that when said force is applied between said shoulder and said base the preponderance of said force is resisted by pressure in said liquid and not by said sides of said bottle.

5. The invention as defined by claim 4 wherein:
said sides are formed in the shape of a bellows.

6. The invention as defined by claim 3 wherein:
said means for converting said force to pressure in said liquid comprises a piston sealingly movable in a cup containing said liquid.

7. The invention as defined by claim 6 wherein:
said piston has a cylindrical shape with an interior end in contact with said liquid and an exterior end adapted for receipt of force,
said exterior end comprises a first spherical protrusion for receipt of force, and including
a protective cover comprising a second spherical protrusion for receipt of force and mating with said first spherical protrusion for transferring force thereto.

8. The invention as defined by claim 3 wherein:
said means for converting said force to pressure in said liquid comprises a neck comprising a channel, and including
an electrically insulating feedthrough member residing in and sealingly mating with said channel for preventing said liquid from passing through said channel,
said electrically insulating feedthrough member including electrical conductors and having an end adapted for submersion in said liquid and having a pressure sensor mounted on said end, said pressure sensor being electrically connected with said electrical conductors.

9. The invention as defined by claim 8 wherein:
said sealingly mating comprises the product of a process comprising heating said neck and inserting said insulating member in said channel.

10. The invention as defined by claim 8 wherein:
said channel and said feedthrough are slightly tapered and said sealingly mating comprises providing an interference fit achieved by pressing said insulating member into said channel.

11. The invention as defined by claim 3, including:
a base connected with said force sensor for resisting movement of sad force sensor in a first direction,
a force applying means connected with said rotatable element for receiving force therefrom and also connected with said force sensor for applying force thereto in said first direction, and
bearing means adapted for allowing relative movement between said force applying means and said base in said first direction and resisting relative movement perpendicular to said first direction between said base and said force applying means.

12. The invention as defined by claim 11 wherein:
said bearing means comprises a spring exerting a spring force in said first direction for causing a spring induced pressure in said liquid that increases the pressure in said liquid by a predetermined amount above the pressure that would exist if only force from said rotatable element were applied to said force applying means,
whereby force applied to said force applying means in said first direction causes said liquid to have a greater pressure than said spring induced pressure and force applied to said force applying means opposite to said first direction causes said liquid to have a smaller pressure than said spring induced pressure.

13. The invention as defined by claim 11 wherein:
said bearing means comprises a Belleville spring adapted to provide a force that is substantially constant over a range of deflections that occur during operation of said seat occupant weight sensing system.

14. The invention as defined by claim 12 and including:
a retaining means engaging said base and said force applying means for preventing force in the direction opposite said first direction from separating said base and said force applying means from each other.

15. The invention as defined by claim 3, including:
a seat belt for restraining an occupant of said seat during a crash, and
a switch having an open state and a closed state and being responsive to tension in said seat belt by being in one of said states at tensions below a predetermined tension and being in the other of said states at higher tensions, and wherein
said processor is electrically connected with said switch for ascertaining said switch state and considering said switch state when controlling said occupant protection means.

16. The invention as defined by claim 1, wherein:
said seat comprises a seat back rotatable about a recline axis and a sensor responsive to the angle of rotation of said seat back about said recline axis by providing a seat back recline signal, and including estimating means responsive to said torque signal and to said seat back recline signal by providing an estimate of the weight of an occupant of said seat to said processor, and wherein
said processor considers said weight estimate when controlling said occupant protection means.

17. The invention as defined by claim 16 wherein said estimating means comprises:
a two dimensional table of weights, wherein:
each weight in said table is identified by a pair of values,
one of each said pair of values is a value of said weight signal, and
the other of each said pair of values is a value of said seat back recline signal, and wherein:
said estimating means is adapted to select weights from said table according to pairs of measured values, each pair of measured values comprising a measured value of said weight signal and a measured value of said seat back recline signal, and
said estimating means considers said weight selected from said table when estimating the weight of an occupant.

18. The invention as defined by claim 1 wherein:
said seat comprises a seat back rotatable about a recline axis and a sensor responsive to the angle of rotation of said seat back about said recline axis by providing a seat back recline signal, and
said seat moves on a track and comprises a sensor providing a seat track position signal indicating the position of said seat on said track, and including
estimating means responsive to said torque signal, said seat back recline signal, and said seat track position signal by providing an estimate of the weight of an occupant of said seat to said processor, and wherein
said processor considers said weight estimate when controlling said occupant protection means.

19. The invention as defined by claim 1, including: an accelerometer responsive to vertical acceleration by producing an acceleration signal indicating vertical acceleration, wherein said processor is responsive to said torque signal and to said acceleration signal by distinguishing between a seat occupied by an adult human and a seat containing a tightly belted child seat and considering what is occupying said seat when controlling said occupant protection means.

20. The invention as defined by claim 19 wherein:

said processing means computes a ratio of the fractional change of said torque signal to the fractional change of said acceleration signal when a vertical acceleration is encountered and asserts said seat contains a tightly belted child seat when said ratio is below a predetermined value.

21. The invention as defined by claim 1 and including:

a seat belt for restraining an occupant of said seat during a crash, and a switch having an open state and a closed state, said switch being responsive to tension in said seat belt by being in one of said states at tensions below a predetermined tension and being in the other of said states at higher tensions, and wherein:
said processor is electrically connected with said switch,
said processor is adapted for determining if said switch is open or closed, and
said processor considers the open or closed state of said switch when controlling said occupant protection means.

22. The invention as defined by claim 1 wherein:

said seat moves on a track and comprises a sensor responsive to the position of said seat on said track by providing a seat track position signal, and including estimating means responsive to information comprising said toque signal and said seat track position signal by estimating the weight of an occupant of said seat, and wherein said processor considers said weight estimate when controlling said occupant protection means.

23. A seat occupant weight sensing system for an occupant protection system of a vehicle, said occupant protection system comprising a processor and occupant protection means controlled by said processor for protecting an occupant, said seat occupant weight sensing system comprising:

a seat, a platform rotatable about a platform axis, said platform axis being located near a forward part of said seat, a seat cushion engaging said platform for transmitting torque about said platform axis received from a seat occupant to said platform, and a force sensor connected with said platform at a distance from said platform axis for receiving force from said platform, and wherein:
said force sensor generating a torque signal responsive to said force, and
said processor is connected with said force sensor for receiving said torque signal and considering said torque when controlling said occupant protection means.

24. The invention as defined by claim 23 wherein:

said force sensor comprises means for converting said force from said platform to pressure in a liquid and pressure sensing means for providing a pressure signal indicating said pressure, whereby
said pressure signal is said torque signal.

25. The invention as defined by claim 24 wherein:

said means for converting said force from said platform to pressure a liquid comprises a bottle having a shoulder and a base joined by sides, and said sides being sufficiently compressible that when said force is applied between said shoulder and said base the preponderance of said force is resisted by pressure in said liquid and not by said sides of said bottle.

26. The invention as defined by claim 25 wherein:

said sides are formed in the shape of a bellows.

27. The invention as defined by claim 24, wherein:

said means for converting said force from said platform to pressure in a liquid comprises a piston sealingly movable in a cup containing said liquid.

28. The invention as defined by claim 24, wherein:

said means for converting said force from said platform to pressure in a liquid comprises an exterior end, and said exterior end comprises a spherical protrusion for receiving force.

29. The invention as defined by claim 23, and including:

a seat belt for restraining an occupant of said seat, and a tension sensor responsive to tension in said seat, belt by generating a tension signal indicating said tension, and wherein said processor is connected with said tension sensor for receiving said tension signal and considering said seat belt tension when controlling said occupant protection means.

30. The invention as defined by claim 29 wherein:

said tension sensor comprises a switch having an open state and a closed state, said tension sensor is responsive to said tension in said seat belt by being in one of said states at tensions below a predetermined value of said tension and being in the other of said states at higher values of said tension, said processor is connected with said switch, and said processor comprises means for applying a voltage to said switch when said switch is in said open state whereby said voltage is said tension signal.

31. A seat occupant weight sensing system for an occupant protection system of a vehicle, said occupant protection system comprising a processor and occupant protection means controlled by said processor for protecting an occupant, said seat occupant weight sensing system comprising:

weight responsive means responsive to force applied to said seat by providing a weight signal, a seat belt for restraining an occupant of said seat during a crash, and a switch having an open state and a closed state, and wherein:
said switch is responsive to tension in said seat belt by being in one of said states at tensions below a predetermined tension and being in the other of said states at higher tensions,
said processor is adapted for determining if said switch is open or closed, and
said processor considers said weight signal and the open or closed state of said switch when controlling said occupant protection means.

32. A seat occupant weight sensing system for an occupant protection system of a vehicle, said occupant protection system comprising a processor and occupant protection means controlled by said processor for protecting an occupant, said seat occupant weight sensing system comprising:

a vehicle seat, and means responsive to force applied to said seat by providing a force signal, and wherein:

said force signal being specifically responsive to the weight of the head and torso of a normally seated adult and minimally responsive to the weight of the lower legs and feet of said normally seated adult if the weight of the lower legs and feet is applied to said seat, and said processor is connected with said means responsive to force applied to said seat considering said force signal when controlling said occupant protection means.

33. The invention as defined by claim 32, wherein said seat comprises:

a seat cushion, an element rotatable about an axis, means for applying downward force applied to said seat cushion by a seat occupant to said rotatable element, and wherein said means providing a force signal comprises a force sensor connected with said rotatable element at a distance from said axis for receiving force from said rotatable element.

34. The invention as defined by claim 33, wherein:

said force sensor comprises: liquid, means for converting said force from said rotatable element to pressure in said liquid, and pressure sensing means for providing a pressure signal indicating said pressure, whereby said pressure signal is said force signal.

35. The invention as defined by claim 34, wherein:

said means for converting said force to pressure in said liquid comprises a bottle having a shoulder, a base and sides joining said shoulder to said base, wherein said sides are sufficiently compressible that when said force is applied between said shoulder and said base the preponderance of said force is resisted by pressure in said liquid and not by said sides of said bottle.

36. The invention as defined by claim 35, wherein:

said sides are formed in the shape of a bellows.

37. The invention as defined by claim 32, wherein:

said seat comprises a platform supporting a seat cushion, said platform is rotatable about a platform axis, said cushion engages said platform for transmitting downward force received from a seat occupant to said platform, and said means providing a force signal comprising said platform and a force sensor engaging said platform at a distance from said platform axis.

38. A seat occupant weight sensing system for an occupant protection system of a vehicle, said occupant protection system comprising a processor and occupant protection means controlled by said processor, said seat occupant weight sensing system comprising:

an atmospheric pressure sensor responsive to atmospheric pressure by providing an atmospheric pressure signal, and weight responsive means responsive to force applied to said seat by providing a weight signal, and wherein:

said weight responsive means comprises a force sensor, said force sensor comprises liquid and means for converting said force to pressure in said liquid and pressure sensing means for providing a pressure signal indicating said pressure, said pressure signal is said weight signal, said processor is connected for receiving said weight signal, said processor is also connected for receiving said atmospheric pressure signal, and said processor considers said weight signal and said atmospheric pressure signal when controlling said occupant protection means.

* * * * *